(12) United States Patent
Chen et al.

(10) Patent No.: US 12,321,688 B2
(45) Date of Patent: Jun. 3, 2025

(54) METHOD AND APPARATUS FOR EDITING ELECTRONIC DOCUMENT, DEVICE, AND STORAGE MEDIUM

(71) Applicant: TENCENT TECHNOLOGY (SHENZHEN) COMPANY LIMITED, Shenzhen (CN)

(72) Inventors: Xingyao Chen, Shenzhen (CN); Song Chen, Shenzhen (CN); Yongbin Liao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 66 days.

(21) Appl. No.: 18/072,495

(22) Filed: Nov. 30, 2022

(65) Prior Publication Data

US 2023/0118214 A1   Apr. 20, 2023

Related U.S. Application Data

(63) Continuation of application No. PCT/CN2022/091790, filed on May 9, 2022.

(30) Foreign Application Priority Data

May 31, 2021   (CN) .......................... 202110604273.7

(51) Int. Cl.
*G06F 40/166*   (2020.01)
*G06Q 10/101*   (2023.01)

(52) U.S. Cl.
CPC ......... *G06F 40/166* (2020.01); *G06Q 10/101* (2013.01)

(58) Field of Classification Search
CPC .................................................. G06F 40/166
See application file for complete search history.

(56) References Cited

U.S. PATENT DOCUMENTS

2006/0053194 A1*  3/2006  Schneider et al. ...... G06F 15/16
2006/0053380 A1*  3/2006  Spataro et al. ......... G06F 17/00
(Continued)

FOREIGN PATENT DOCUMENTS

CN   101808297 A   8/2010
CN   105743973 A   7/2016
(Continued)

OTHER PUBLICATIONS

The World Intellectual Property Organization (WIPO) International Search Report for PCT/CN2022/091790 Jul. 20, 2022 7 Pages (including translation).

(Continued)

*Primary Examiner* — James J Debrow
(74) *Attorney, Agent, or Firm* — ANOVALAW GROUP PLLC

(57) ABSTRACT

A method for editing an electronic document includes: opening a second editing interface of an electronic document in a second client by using an insertion collaboration entry provided by a first client on a first computer device, the insertion collaboration entry being used for collaborating with the first client to perform a multimedia file insertion into the electronic document; obtaining a multimedia file; and inserting the multimedia file into a first insertion position in the second editing interface of the electronic document.

19 Claims, 15 Drawing Sheets

(56) References Cited

U.S. PATENT DOCUMENTS

| | | | | |
|---|---|---|---|---|
| 2013/0151940 A1* | 6/2013 | Bailor et al. | ............ | G06F 17/00 |
| 2017/0083490 A1* | 3/2017 | Kikin-Gil et al. | ...... | G06F 17/24 |
| 2018/0067906 A1 | 3/2018 | Fujisaki et al. | | |
| 2018/0129641 A1* | 5/2018 | Elliott | ................... | G06F 17/243 |

FOREIGN PATENT DOCUMENTS

| | | |
|---|---|---|
| CN | 106021202 A | 10/2016 |
| CN | 106681976 A | 5/2017 |
| CN | 109976617 A | 7/2019 |
| CN | 111027289 A | 4/2020 |
| CN | 112667585 A | 4/2021 |
| CN | 113191117 A | 7/2021 |
| JP | 2002041502 A | 2/2002 |
| JP | 2010029689 A | 2/2010 |
| JP | 2018041243 A | 3/2018 |
| JP | 2019020789 A | 2/2019 |
| WO | 2009090890 A1 | 7/2009 |

OTHER PUBLICATIONS

The European Patent Office (EPO) The Extended European Search Report for 22814979.5 Apr. 30, 2024 10 Pages.

Anonymous: "Adding text", Apr. 27, 2021 (Apr. 27, 2021), XP093153862, Retrieved from the Internet: URL: https://helpx.adobe.com/incopy/using/adding-text.html.

The Japan Patent Office (JPO) Notice of Reasons for Refusal for Application No. 2023-537970 Sep. 3, 2024 10 Pages (including translation).

The Japan Patent Office (JPO) Notice of Reasons for Refusal for Application No. 2023-537970 Mar. 11, 2025 12 Pages (including translation).

* cited by examiner

METHOD AND APPARATUS FOR EDITING ELECTRONIC DOCUMENT, DEVICE, AND STORAGE MEDIUM

CROSS-REFERENCES TO RELATED APPLICATIONS

This application is a continuation application of PCT Patent Application No. PCT/CN2022/091790, filed on May 5, 2022, which claims priority to Chinese Patent Application No. 202110604273.7, entitled "METHOD AND APPARATUS FOR EDITING ELECTRONIC DOCUMENT, DEVICE, AND STORAGE MEDIUM" filed on May 31, 2021, the entire contents of both of which are incorporated herein by reference.

FIELD OF THE TECHNOLOGY

The present disclosure relates to the field of office automation, and in particular, to a method and apparatus for editing an electronic document, a device, and a storage medium.

BACKGROUND OF THE DISCLOSURE

Electronic documents are the most widely used office applications during daily office use, for example, the word processing program Word, the form processing program Excel, and the presentation processing program PPT.

In a process of editing an electronic document with a computer, there is a demand for inserting a picture into an electronic document. For example, when taking class notes, a user needs to take a picture of text content on a textbook and add the picture to the class notes. In the related art, after taking the picture of the text content on the textbook with a mobile phone, the user transfers the picture to a computer through an instant messaging program, a data cable, or a local area network synchronization tool. Then, the user uses a file manager in the computer to find the picture, and inserts the picture into a specified position of the electronic document in a copying and pasting manner.

The foregoing method not only requires using a transmission program other than the electronic document, but also requires more human-computer interaction steps, resulting in relatively low human-computer interaction efficiency of the whole procedure.

SUMMARY

Embodiments of the present disclosure provide a method and apparatus for editing an electronic document, a device, and a storage medium. Through the method, a picture can be quickly inserted into an electronic document. The technical solutions are as follows:

According to an aspect of the present disclosure, a method for editing an electronic document is provided, performed by a second computer device, the method including: opening a second editing interface of an electronic document in a second client by using an insertion collaboration entry provided by a first client on a first computer device, the insertion collaboration entry being used for collaborating with the first client to perform a multimedia file insertion into the electronic document; obtaining a multimedia file; and inserting the multimedia file into a first insertion position in the second editing interface of the electronic document.

According to an aspect of the present disclosure, a method for editing an electronic document is provided, performed by a first computer device, the method including: displaying a first editing interface of an electronic document in a first client; generating an insertion collaboration entry of the electronic document in response to an insertion collaboration operation on the first editing interface, the insertion collaboration entry being used for collaborating with a second client on a second computer device for multimedia file insertion into the electronic document; and providing the insertion collaboration entry to the second client.

According to another aspect of the present disclosure, an apparatus for editing an electronic document is provided, including: an access module, configured to open a second editing interface of an electronic document in a second client by using an insertion collaboration entry provided by a first client on a first computer device, the insertion collaboration entry being used for collaborating with the first client to perform a multimedia file insertion into the electronic document; an obtaining module, configured to obtain a to-be-inserted multimedia file; and an insertion module, configured to insert the multimedia file into a first insertion position in the second editing interface of the electronic document.

According to another aspect of the present disclosure, an apparatus for editing an electronic document is provided, including: a display module, configured to display a first editing interface of an electronic document in a first client; a generation module, configured to generate an insertion collaboration entry of the electronic document in response to an insertion collaboration operation on the first editing interface, the insertion collaboration entry being used for collaborating with a second client on a second computer device for multimedia file insertion into the electronic document; and an output module, configured to provide the insertion collaboration entry to the second client.

According to another aspect of the present disclosure, a computer device is provided, including a processor and a memory, the memory storing at least one instruction, at least one program, a code set, or an instruction set, the at least one instruction, the at least one program, the code set, or the instruction set being loaded and executed by the processor to implement the method for editing an electronic document described in the foregoing aspects.

According to another aspect of the present disclosure, a non-transitory computer-readable storage medium is provided, storing at least one piece of program code, the at least one piece of program code being loaded and executed by a processor to implement the method for editing an electronic document described in the foregoing aspects.

According to another aspect of the present disclosure, a computer program product (or a computer program) is provided, the computer program product (or the computer program) including computer instructions, the computer instructions being stored in a computer-readable storage medium. A processor of a computer device reads the computer instructions from the computer-readable storage medium, the processor executing the computer instructions to cause the computer device to perform the method for editing an electronic document described in the foregoing aspects.

The technical solutions provided in the embodiments of the present disclosure include at least the following beneficial effects:

An electronic document is opened in the first client of the first computer device. In this case, an insertion collaboration entry of electronic document can be provided through the first client. The electronic document is synchronized to the second client on the second computer device based on the insertion collaboration entry, and further, a multimedia file is inserted into the electronic document by using the second client, for example, a multimedia file acquired by a mobile terminal in real time or a multimedia file in local files is quickly and accurately inserted by using the second client into an electronic document currently in an editing state in the first client, so that a capability of quickly inserting a multimedia file can be implemented through only a plurality of simple operations.

DESCRIPTION OF EMBODIMENTS

Figure 1:
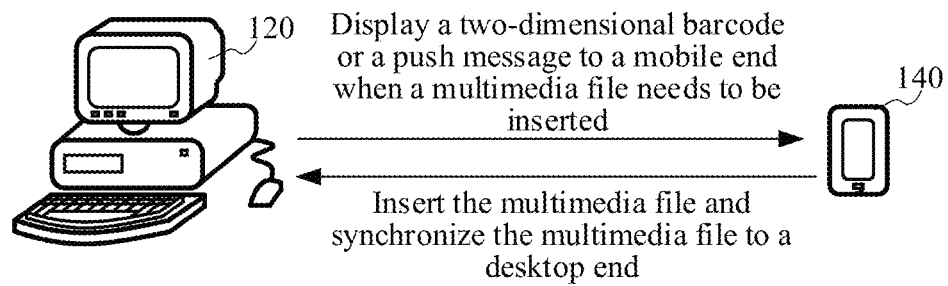
FIG. 1 is a schematic principle diagram of a method for editing an electronic document according to an exemplary embodiment of the present disclosure.

Because a user has a demand for quickly inserting a picture into an electronic document in a process of editing the electronic document on a computer device such as a desktop computer or a notebook computer, the present disclosure provides a method for quickly inserting a picture into an electronic document. As shown in FIG. 1, a user edits an electronic document by using a desktop client in a computer device 120. When having a demand for inserting a picture into the electronic document, the user uses the desktop client to provide an insertion collaboration entry to a mobile client. The insertion collaboration entry may be a two-dimensional barcode or a push message.

The user uses a mobile client in a mobile terminal 140 to access the electronic document by using the insertion collaboration entry, and automatically locates a target insertion position into which a multimedia file needs to be inserted. The user uses the mobile terminal 140 to take a picture or select a picture from a local album, and inserts the picture into the target insertion position. The picture is automatically synchronized to the desktop client, to implement the function of quickly inserting a picture.

Figure 2:
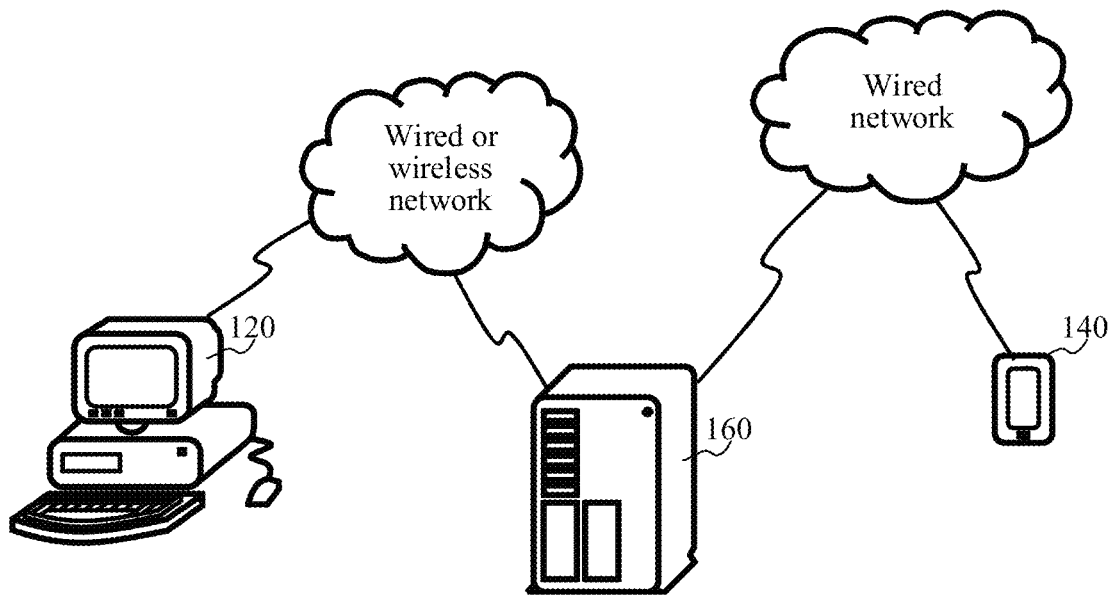
FIG. 2 is a schematic structural diagram of a computer system according to an exemplary embodiment of the present disclosure.

FIG. 2 is a block diagram of a computer system 100 according to an exemplary embodiment of the present disclosure. The computer system 100 includes a computer device 120, a mobile terminal 140, and a server 160.

A first application supporting a function of editing an electronic document is run on the computer device 120. The first application may be a dedicated application, an applet in an application (App), or a web client. In some embodiments, the first application is also referred to as a first client. In some examples, the computer device 120 is a computer device with a limited or restricted shooting capability, for example, a desktop computer without a camera, or a desktop computer or notebook computer with a fixed camera above a display screen.

The computer device 120 is connected to the server 160 by a wireless network or a wired network.

A second application supporting a function of editing an electronic document is run on the mobile terminal 140. The second application may be a dedicated application, an applet in an application (App), or a web client. In some embodiments, the second application is also referred to as a second client. In some examples, the mobile terminal 140 is a computer device with a limited or restricted shooting capability, for example, a desktop computer without a camera, or a desktop computer or notebook computer with a fixed camera above a display screen. The first application and the second application are the same program or different programs. For example, applications of the same type are programs developed by different operating systems or are programs respectively developed for different terminal types. In another example, the first application is an application on a desktop operating system, and the second application is an application, an applet, or a web application on a mobile operating system. An applet is a program that is run depending on a parent application, and the parent application provides a basic running platform. Therefore, the applet can be loaded in real time and does not need to be installed.

The mobile terminal 140 is connected to the server 160 by a wireless network and a wired network.

The server 160 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. In some embodiments, the server 160 includes a collaboration server and a push server. The collaboration server is configured to provide a document collaboration capability between the first application and the second application. The push server is configured to provide a pushing capability of a push message. The term "plurality of" in the embodiments of the present disclosure means two or more.

Figure 3:
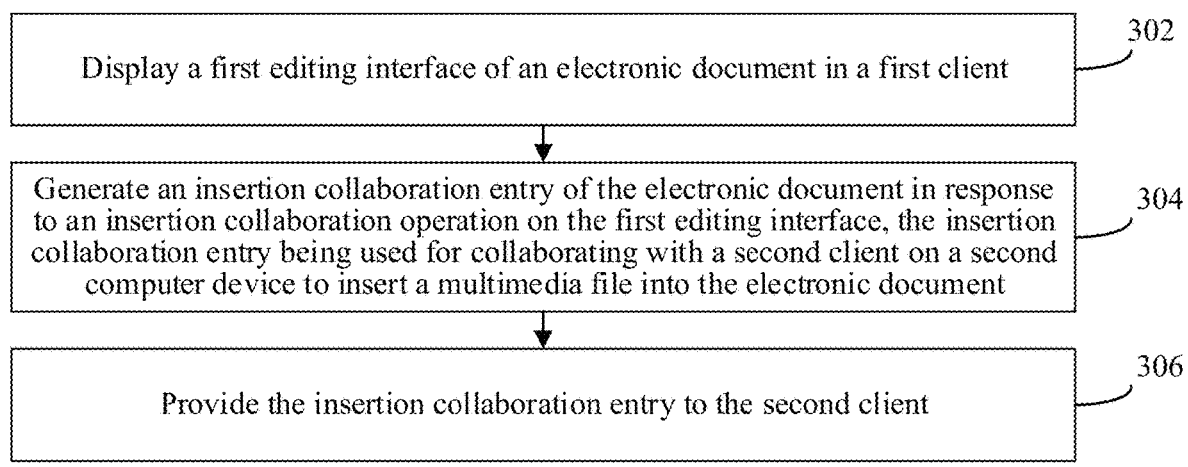
FIG. 3 is a schematic flowchart of a method for editing an electronic document according to an exemplary embodiment of the present disclosure.

FIG. 3 is a flowchart of a method for editing an electronic document according to an exemplary embodiment of the present disclosure. The method is performed by a first computer device, a first client, or a desktop client. The method includes the following steps:

Step 302: Display a first editing interface of an electronic document in a first client.

In a process of editing an electronic document by a user using a first client, a first editing interface of the electronic document is displayed in the first client. The electronic document includes at least one of a word processing program, a form processing program, a presentation processing program, a note processing program, or a collection form.

The first editing interface of the first client provides one or more editing functions. The editing function includes, but is not limited to, at least one of a text format-related function, a paragraph format-related function, a chart insertion-related function, a multimedia file insertion-related function, a review-related function, an electronic document viewing mode-related function, or a translation-related function.

In some embodiments, all or some editing functions of the electronic document support real-time collaboration on a plurality of terminals. In an example, all editing functions of the electronic document support real-time collaboration on a plurality of terminals. In another example, some editing functions of the electronic document support real-time collaboration on a plurality of terminals, for example, a function of inserting a multimedia file.

In some embodiments, the first client is an application supporting electronic document editing. The first client is run on the first computer device. In some embodiments, the first computer device is a computer device with a limited or restricted shooting capability, for example, a desktop computer or a notebook computer.

Step 304: Generate an insertion collaboration entry of the electronic document in response to an insertion collaboration operation on the first editing interface, the insertion collaboration entry being used for collaborating with a second client on a second computer device for multimedia file insertion into the electronic document.

When the multimedia file needs to be inserted into the electronic document, the user triggers an insertion collaboration operation on the first editing interface of the first client, and then, may add an access link of the electronic document to collaboration entry information of the electronic document, to generate an insertion collaboration entry carrying the collaboration entry information. In some embodiments, an insertion collaboration control is displayed in the first editing interface of the first client, and when the user triggers the insertion collaboration control with a peripheral such as a mouse or a touchscreen, the first client considers that an insertion collaboration operation is received. The manner of triggering the insertion collaboration control includes, but is not limited to, a click, a double-click, a drag, a gesture trigger, a voice trigger, and the like.

Figure 4:
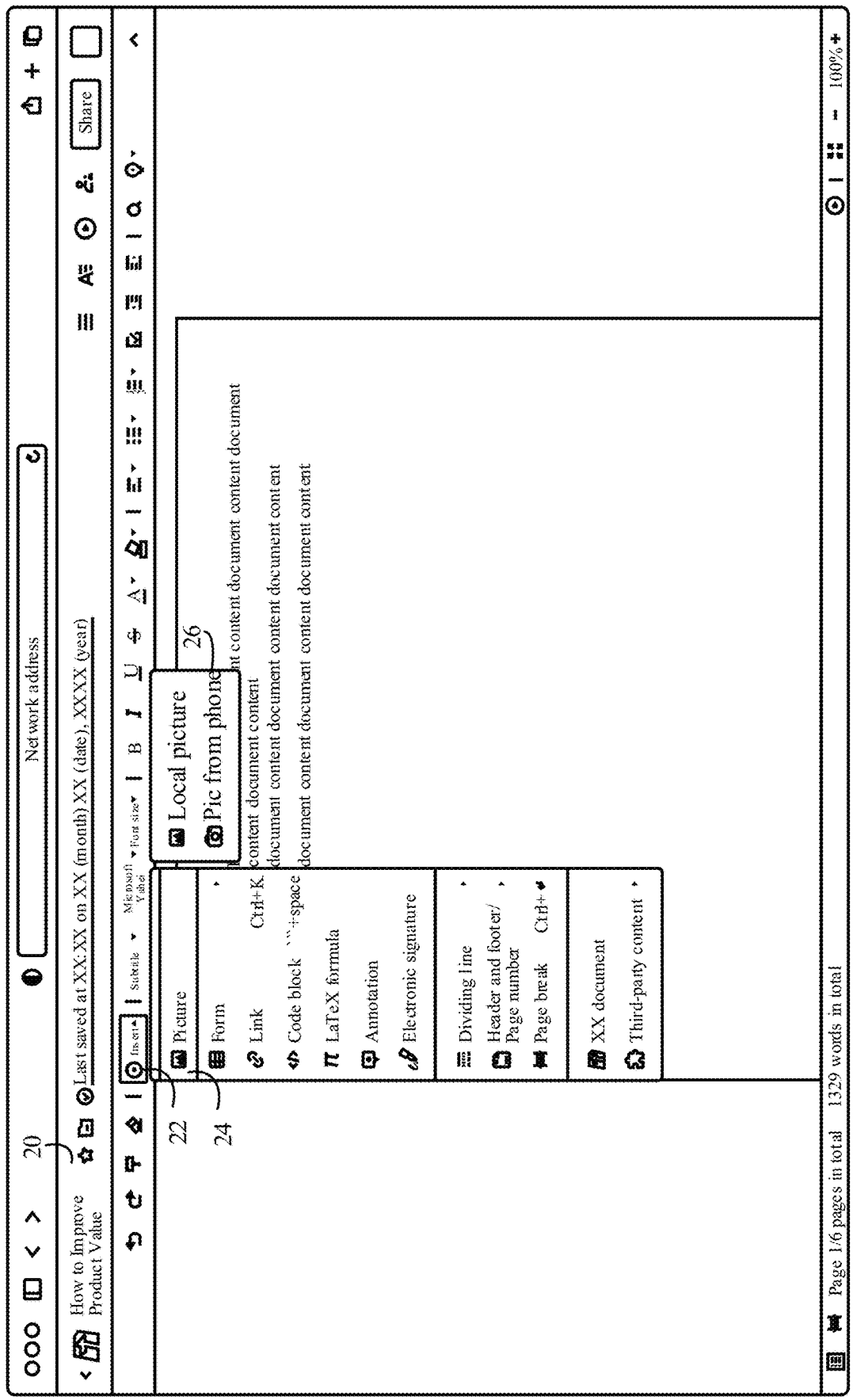
FIG. 4 is a schematic diagram of an interface of a method for editing an electronic document according to an exemplary embodiment of the present disclosure.

Referring to FIG. 4, an insertion button 22 is displayed in a first editing interface 20 of the electronic document in the first client. After the user clicks the insertion button 22, an insertion menu is displayed. Candidate insertion options, such as a picture option 24, a form option, a link option, a code block option, a formula annotation option, an electronic signature option, a dividing line option, and a header and footer option, are displayed in the insertion menu. After the user clicks the picture option 24, a secondary insertion menu is displayed. An insertion collaboration control 26 is displayed in the secondary insertion menu. For example, the insertion collaboration control 26 is a button referred to as "Take a picture with the mobile phone or select a picture from the mobile phone". After the user clicks the insertion collaboration control 26, the first client receives an insertion collaboration operation.

The insertion collaboration entry is an access entry generated based on a collaboration link of the electronic document. The insertion collaboration entry includes: at least one of an insertion collaboration graphic barcode, a push message for starting insertion collaboration, a short message for starting insertion collaboration, email information for starting insertion collaboration, or an instant messaging message for starting insertion collaboration.

Schematically, the same user account (also referred to as an "object account") is logged in to the first client and second client. Alternatively, two different two user accounts log in to the first client and second client, both of the user accounts have an editing permission of the electronic document.

Step 306: Provide the insertion collaboration entry to the second client.

When the insertion collaboration entry includes the insertion collaboration graphic barcode, the first client provides the insertion collaboration entry to the second client by displaying the insertion collaboration graphic barcode. Alternatively, when the insertion collaboration entry includes the push message, the first client transmits the push message to the second client. Alternatively, when the insertion collaboration entry includes the short message, the first client transmits the short message to the second computer device. For example, the first client transmits the short message to the second computer device based on a phone number, the phone number being a phone number associated with a user account logged in to the electronic document.

Alternatively, when the insertion collaboration entry includes the email information, the first client transmits the email information to the second computer device. For example, a mailbox client is run on the second computer device, a mailbox account is logged in to the mailbox client, and the mailbox account is an account associated with the user account logged in to the electronic document. The first client transmits the email information to the mailbox client based on the mailbox account. Alternatively, when the insertion collaboration entry includes the instant messaging message, the first client transmits the instant messaging message to the second client. For example, the user account logged in to the electronic document and the user account logged in to the second client are the same user account or associated user accounts, and the first client transmits the instant messaging message to the user account in the second client.

In conclusion, in the method provided in this embodiment, an insertion collaboration entry is provided by the first client to the second client, editing of the electronic document is synchronized between the first client and the second client through the insertion collaboration entry, and further, a multimedia file can be inserted into the electronic document by using the second client, for example, a multimedia file acquired by a mobile terminal in real time or a multimedia file in local files is quickly and accurately inserted by using the second client into an electronic document currently in an editing state in the first client, so that a capability of quickly inserting a multimedia file can be implemented through only a plurality of simple operations.

Figure 5:
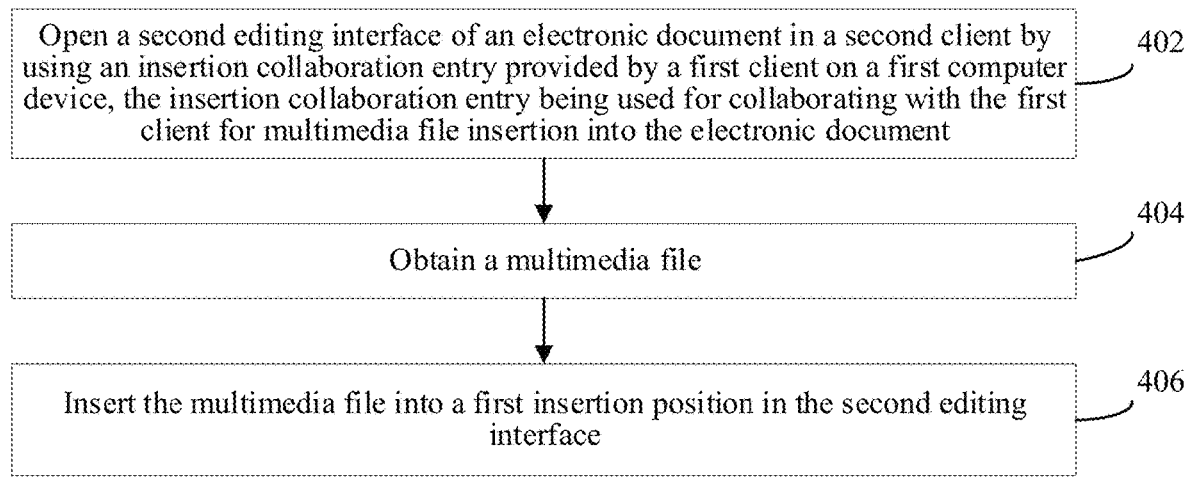
FIG. 5 is a schematic flowchart of a method for editing an electronic document according to an exemplary embodiment of the present disclosure.

FIG. 5 is a flowchart of a method for editing an electronic document according to an exemplary embodiment of the present disclosure. The method is performed by a second computer device, a second client, or a mobile client. The method includes the following steps:

Step 402: Open a second editing interface of an electronic document in a second client by using an insertion collaboration entry provided by a first client on a first computer device, the insertion collaboration entry being used for collaborating with the first client to perform a multimedia file insertion into the electronic document.

The second computer device reads, through the second client, collaboration entry information carried by the insertion collaboration entry, the collaboration entry information including an access link of the electronic document; and open the second editing interface of the electronic document in the second client based on the access link of the electronic document.

In some embodiments, the insertion collaboration entry includes: at least one of an insertion collaboration graphic barcode, a push message for starting insertion collaboration, a short message for starting insertion collaboration, email information for starting insertion collaboration, or an instant messaging message for starting insertion collaboration.

The collaboration entry information may be read in any one of the following manners:

Identify, when the insertion collaboration entry includes the insertion collaboration graphic barcode, the collaboration entry information carried in the insertion collaboration graphic barcode. For example, a camera is invoked through the second client, and the insertion collaboration graphic barcode is scanned by using the camera, to obtain the collaboration entry information carried in the insertion collaboration graphic barcode.

Display the push message when the insertion collaboration entry includes the push message, and read, in response to a trigger operation on the push message, the collaboration entry information carried in the push message. For example, the second computer device receives a push message pushed by the first client to the second client, pops up the push message by using a pop-up window, the push message including the access link of the electronic document, and reads and obtains the access link of the electronic document in response to a trigger operation on the push message.

Display the short message when the insertion collaboration entry includes the short message, and read, in response to a trigger operation on the short message, the collaboration entry information carried in the short message. For example, the second computer device receives the short message transmitted by the first client based on a phone number, where the phone number may be a phone number associated with a user account logged in to the electronic document, and the short message includes an access link of the electronic document, and reads and obtains the access link of the electronic document in response to a trigger operation on the short message.

Display the email information when the insertion collaboration entry includes the email information, and read, in response to a trigger operation on the email information, the collaboration entry information carried in the email information. For example, the second computer device receives email information transmitted by the first client based on a mailbox account, the mailbox account being an account associated with a user account logged in to the electronic document, and the email information including an access link of the electronic document, and reads and obtains the access link of the electronic document in response to a trigger operation on the email information.

Display the instant messaging message when the insertion collaboration entry includes the instant messaging message, and read, in response to a trigger operation on the instant messaging message, the collaboration entry information carried in the instant messaging message. For example, the first client and second client may be the same clients running on different computer devices. The second client receives an instant messaging message transmitted by the first client, and displays the instant messaging message in a dialog interface between the first computer device and the second computer device, for example, displays the instant messaging message in a dialog interface between "My computer" and "My mobile phone", the instant messaging message including an access link of the electronic document, and reads and obtains the access link of the electronic document in response to a trigger operation on the instant messaging message.

In a process of editing an electronic document by a user using a second client, a second editing interface of the electronic document is displayed in the second client.

The second editing interface provides one or more editing functions. The editing function includes, but is not limited to, at least one of a text format-related function, a paragraph format-related function, a chart insertion-related function, a multimedia file insertion-related function, a review-related function, an electronic document viewing mode-related function, or a translation-related function.

In some embodiments, editing functions in the second editing interface are the same as editing functions in the first editing interface. In some embodiments, editing functions in the second editing interface are a subset of editing functions in the first editing interface.

In some embodiments, all or some editing functions of the electronic document support real-time collaboration on a plurality of terminals. In an example, all editing functions of the electronic document support real-time collaboration on a plurality of terminals. In another example, some editing functions of the electronic document support real-time collaboration on a plurality of terminals, for example, a function of inserting a multimedia file.

In some embodiments, the second client is an application supporting electronic document editing. The second client is run on the second computer device or the mobile terminal. In some embodiments, the second computer device is a computer device having a shooting capability better than that of the first computer device, for example, a tablet computer or a mobile phone, or a computer device with an external camera.

Schematically, the same user account is logged in to the first client and second client. Alternatively, two different two user accounts log in to the first client and second client, both of the user accounts have an editing permission of the electronic document.

Step 404: Obtain a multimedia file to be inserted.

The multimedia file includes at least one of a picture, a video, or audio.

The second client obtains the to-be-inserted multimedia file. Using an example in which the multimedia file is a picture, the second client uses a camera to capture a picture or selects a picture from local files. Using an example in which the multimedia file is a video, the second client uses a camera to capture a video or selects a video from local files. Using an example in which the multimedia file is audio, the second client uses a microphone to record audio or selects audio from local files.

A source from which the multimedia file is obtained is not limited in this embodiment. The second client may also obtain the to-be-inserted multimedia file by downloading, or obtain the to-be-inserted multimedia file through an instant messaging message in an instant messaging program.

Step 406: Insert the multimedia file into a first insertion position in the second editing interface of the electronic document.

For example, the first insertion position refers to a target insertion position of the multimedia file in the electronic document in the second client.

The second client inserts the multimedia file into the first insertion position in the second editing interface, and display the multimedia file at the first insertion position. At the same time, the multimedia file inserted into the electronic document is synchronized to the first client, and the multimedia file is also displayed in the first editing interface of the first client.

In conclusion, in the method provided in this embodiment, the electronic document in the first client is synchronized to the second client on the second computer device based on the insertion collaboration entry provided by the first client on the first computer device, and further, a multimedia file is inserted into the electronic document by using the second client, for example, a multimedia file acquired by a mobile terminal in real time or a multimedia file in local files is quickly inserted by using the second client into an electronic document currently in an editing state in the first client, so that a capability of quickly inserting a multimedia file can be implemented through only a plurality of simple operations.

Figure 6:
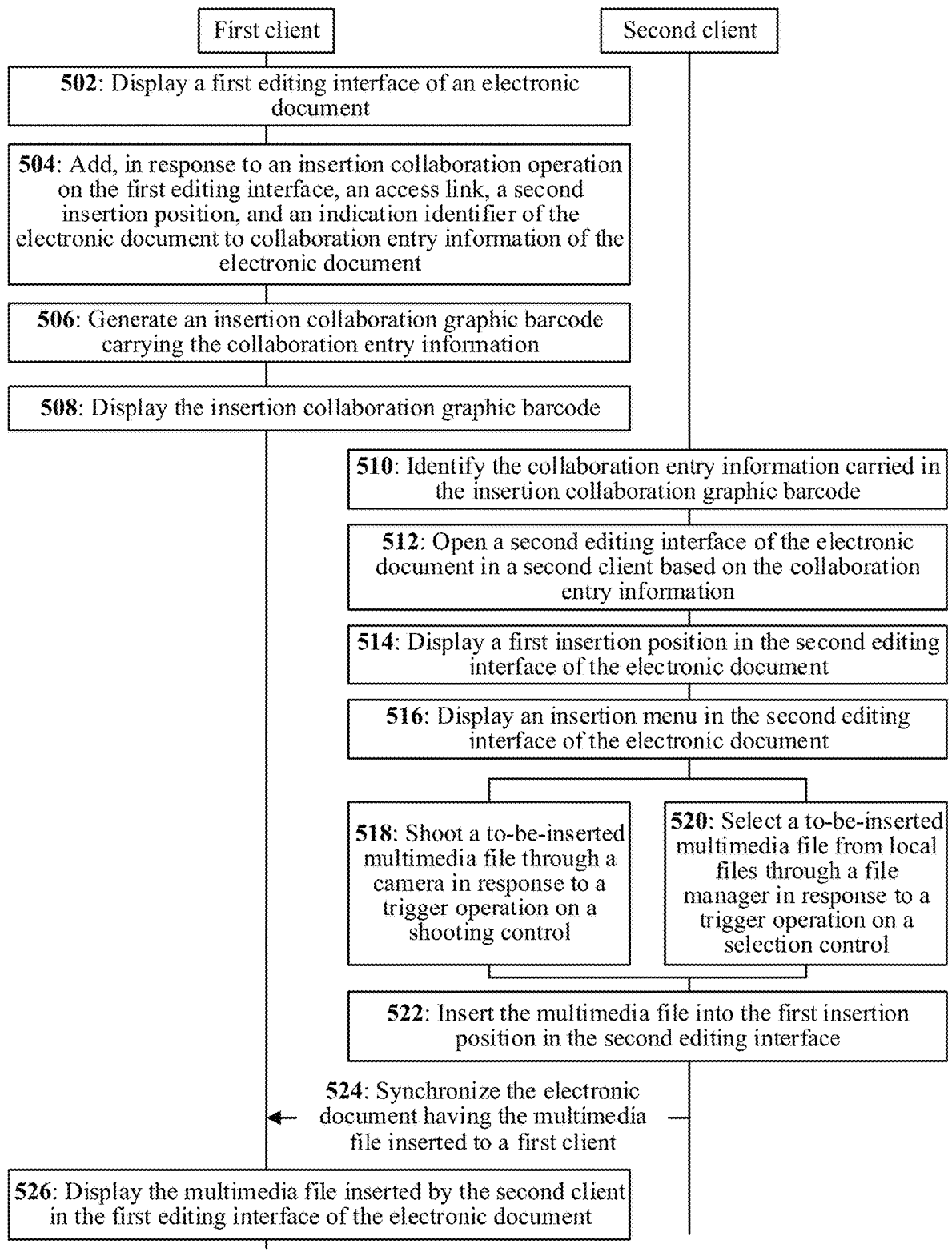
FIG. 6 is a schematic flowchart of a method for editing an electronic document according to an exemplary embodiment of the present disclosure.

When the Insertion Collaboration Entry is a Graphic Code:

FIG. 6 is a flowchart of a method for editing an electronic document according to an exemplary embodiment of the present disclosure. The method is performed collaboratively by the first client and the second client. The method includes the following steps:

Step 502: The first client displays a first editing interface of an electronic document.

For the detailed implementation of step 502, reference may be made to step 302, and details are not described herein again.

Step 504: The first client adds, in response to an insertion collaboration operation on the first editing interface, an access link, a second insertion position, and an indication identifier of the electronic document to collaboration entry information of the electronic document.

When the multimedia file needs to be inserted into the electronic document, the user triggers an insertion collaboration operation on the first editing interface of the first client. In some embodiments, an insertion collaboration control is displayed in the first editing interface of the first client, and when the user triggers the insertion collaboration control with a peripheral such as a mouse or a touchscreen, the first client considers that an insertion collaboration operation is received. The manner of triggering the insertion collaboration control includes, but is not limited to, a click, a double-click, a drag, a gesture trigger, a voice trigger, and the like. Referring to FIG. 4, the user clicks the insertion collaboration control 26, and the first client receives an insertion collaboration operation.

In some embodiments, the first client adds an access link of the electronic document to collaboration entry information of the electronic document. Additionally/Alternatively, the first client adds a second insertion position as insertion position information to the collaboration entry information of the electronic document. The insertion position information is used for indicating a first insertion position of the multimedia file in a second editing interface. The second editing interface is an interface of the electronic document in the second client. Additionally/Alternatively, the first client adds an indication identifier to the collaboration entry information. The indication identifier is an identifier used for instructing the second client to automatically invoke an insertion menu. That is, the indication identifier is an identifier used for instructing automatically invoking the insertion menu in an editing interface of a mobile end. Additionally/Alternatively, the first client adds a user account to the collaboration entry information of the electronic document. For example, the user account may be an account logged in to the electronic document.

The access link of electronic document is an entry link used for accessing document content of the electronic document. Schematically, the document content of the electronic document is stored in a collaboration server, and the document content of the electronic document can be accessed on different computer devices through the entry link.

The second insertion position is a real-time position of an editing cursor of the electronic document in the first editing interface, for example, before the $xx^{th}$ character in the $xx^{th}$ line of the $xx^{th}$ paragraph in the electronic document, or after the $xx^{th}$ character. The numeric expression of the second insertion position is not limited in the present disclosure.

The user account is a certificate used for determining an access permission of the electronic document. Schematically, the user account includes a user account logged in to the first client, or the user account includes all user accounts having access and editing permissions.

Step 506: The first client generates an insertion collaboration graphic barcode carrying the collaboration entry information.

The insertion collaboration graphic barcode is represented by a barcode image or a two-dimensional barcode. Using an example in which the insertion collaboration graphic barcode is a two-dimensional barcode as an example, the first client encodes the collaboration entry information in a two-dimensional barcode encoding manner, to obtain the insertion collaboration graphic barcode.

In some embodiments, the first client generates an insertion collaboration graphic barcode after mapping the collaboration entry information into a short link in a short link mapping manner. Alternatively, the first client generates an insertion collaboration graphic barcode after encrypting the collaboration entry information to obtain encrypted information.

Step 508: The first client displays the insertion collaboration graphic barcode.

In the first editing interface of the electronic document in the first client, the first client displays a pop-up window in a superimposed manner. The pop-up window displays the insertion collaboration graphic barcode.

Figure 7:
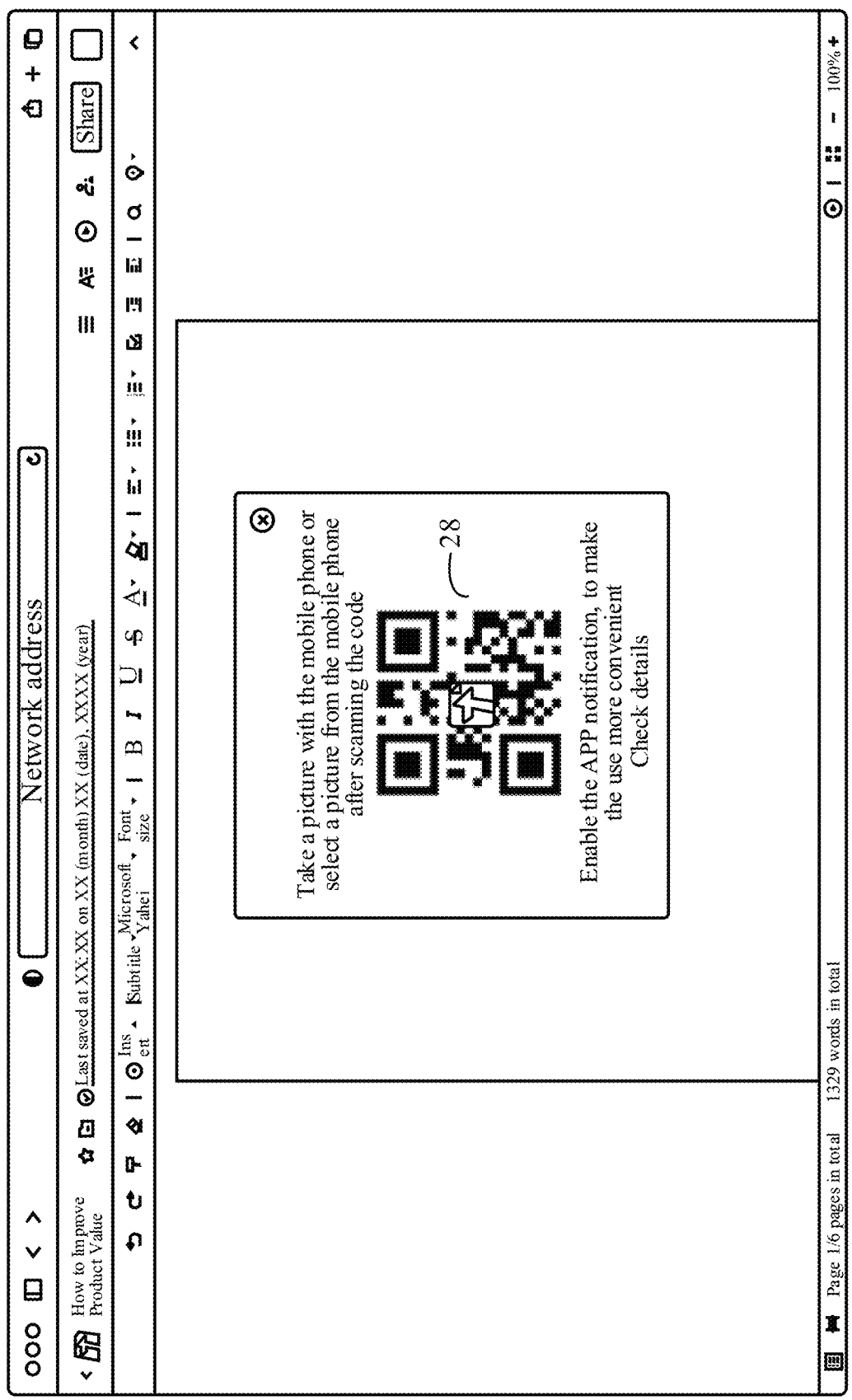
FIG. 7 is a schematic diagram of an interface of a method for editing an electronic document according to an exemplary embodiment of the present disclosure.

Referring to FIG. 7, the first client displays an insertion collaboration graphic barcode 28 in the first editing interface of the first client. The insertion collaboration graphic barcode 28 is displayed in a pop-up window, and a close button is arranged in the upper right corner of the pop-up window.

In an example, when the close button is clicked, the pop-up window is closed. In another example, after the insertion collaboration graphic barcode 28 is scanned, the collaboration server transmits a scan notification message to the first client, and the pop-up window is automatically closed according to the scan notification message.

Step 510: The second client identifies the collaboration entry information carried in the insertion collaboration graphic barcode.

Using an example in which the insertion collaboration graphic barcode is a two-dimensional barcode, the second client identifies the collaboration entry information carried in the insertion collaboration graphic barcode.

In an example, the second client itself has a code scanning capability, and the second client scans the insertion collaboration graphic barcode through the camera on the mobile terminal, and further identifies the collaboration entry information carried in the insertion collaboration graphic barcode.

In an example, the user scans the scan insertion collaboration graphic barcode by using another program with a code scanning capability on the mobile terminal, and then the another program invokes operation of the second client. Then, the another program transfers the collaboration entry information to the second client.

When the collaboration entry information is represented by a short link, the second client needs to use the short link to obtain detailed information of the collaboration entry information from the collaboration server. When the collaboration entry information is encrypted, the second client needs to obtain the collaboration entry information after decrypting the encrypted information.

The collaboration entry information includes an access link, insertion position information, and an indication identifier of the electronic document. In some embodiments, the insertion position information and the indication identifier are optional.

Figure 8:
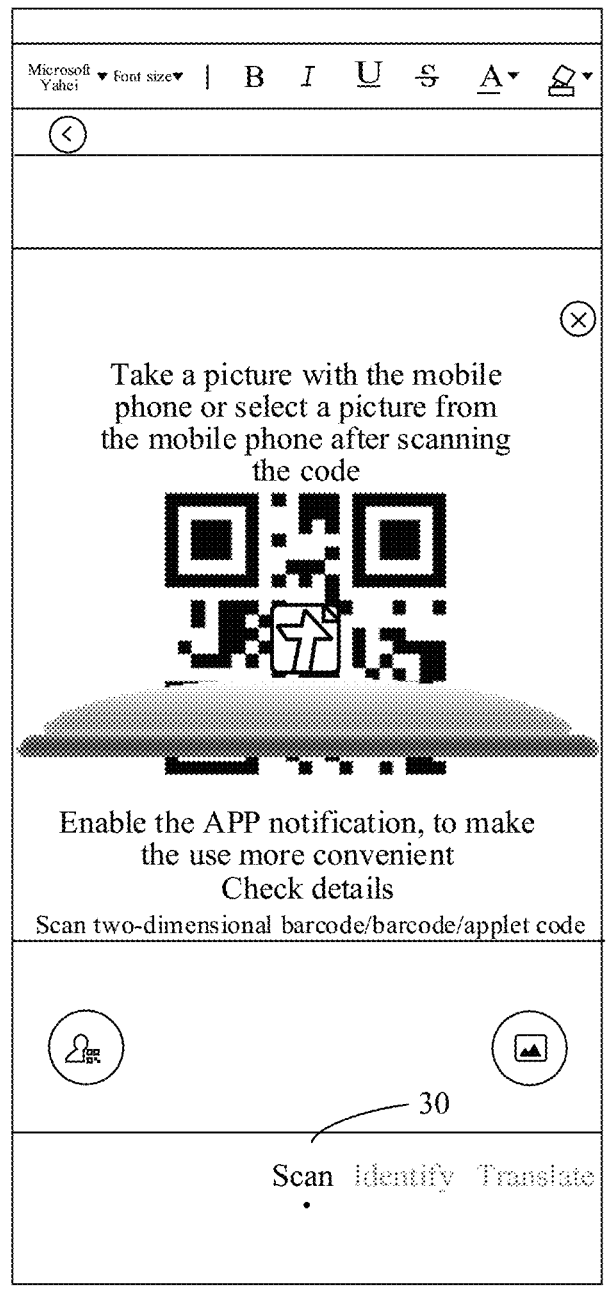
FIG. 8 is a schematic diagram of an interface of a method for editing an electronic document according to an exemplary embodiment of the present disclosure.

Referring to FIG. 8, the user scans the insertion collaboration graphic barcode by using a scanning function 30 of the second client, to identify the collaboration entry information in the insertion collaboration graphic barcode.

Step 512: The second client opens a second editing interface of the electronic document in the second client based on the collaboration entry information.

The second client opens the second editing interface of the electronic document in the second client according to the access link of the electronic document. Schematically, the second client obtains document content of the electronic document according to the access link of the electronic document, and loads and displays the document content of the electronic document, to display the second editing interface of the electronic document in the second client.

In some embodiments, the collaboration entry information further includes a user account. When the second client or server identifies that its user account matches the user account in the collaboration entry information (that is, the same user account), that is, when its user account has an editing permission of the electronic document, the second editing interface of the electronic document is opened in the second client.

Alternatively, when the user account in the second client is different from the user account in the first client, and the user account in the second client has the editing permission of the electronic document, the second client opens the second editing interface of the electronic document in the second client.

Step 514: The second client displays a first insertion position in the second editing interface of the electronic document.

The first insertion position is an editing position in the second editing interface into which a multimedia file needs to be inserted. The first insertion position in the second editing interface is the same as the second insertion position in the first editing interface. The second insertion position is an insertion position of the multimedia file in the first editing interface. For example, the second insertion position is a cursor position in the first editing interface of the electronic document in the first client.

In a possible design, the second client obtains insertion position information from the collaboration entry information, the insertion position information being used for indicating the first insertion position. Then, the second client displays the first insertion position indicated by the insertion position information in the second editing interface of the electronic document.

For example, the first insertion position is line 21 of page 13 of the electronic document, and the second client automatically locates the first insertion position for display based on the insertion position information.

When the first insertion position is not in a current display range of the editing interface of the mobile end, the second client jumps to the first insertion position indicated by the insertion position information for display.

In another possible design, after the second client opens the second editing interface of the electronic document, the second insertion position is synchronized based on the user account logged in to the second client. The second insertion position is displayed as the first insertion position in the second editing interface of the electronic document.

When the same user account is logged in to the first client and the second client, the collaboration server synchronously saves the second insertion position in the first client, and establishes correspondences between the user account, the electronic document, and the second insertion position. After the second editing interface of the electronic document is opened in the second client, based on the user account logged in to the second client, the second client has the second insertion position of the user account in the electronic document synchronized from the collaboration server, to obtain a real-time second insertion position. That is, even if the user changes the second insertion position in the first client after the insertion collaboration graphic barcode is generated, the second client can also have the second insertion position synchronized, thereby maintaining the second insertion position displayed in the first client the same as the first insertion position displayed in the second client.

When different user accounts are logged in to the first client and the second client, assuming that there are a plurality of user accounts simultaneously collaborating to edit the electronic document, the collaboration server synchronously saves second insertion positions of all user accounts in the electronic document, and establishes correspondences between the user accounts, the electronic document, and the second insertion positions. For example, the same electronic document has three second insertion positions corresponding to a user account 1, a user account 2, and a user account 3. After the second editing interface of the electronic document is opened in the second client, based on the user account 2 logged in to the second client, the second client has a second insertion position of the user account 2 in the electronic document synchronized from the collaboration server, to obtain a real-time second insertion position.

Step 516: The second client displays an insertion menu in the second editing interface of the electronic document.

Figure 9:
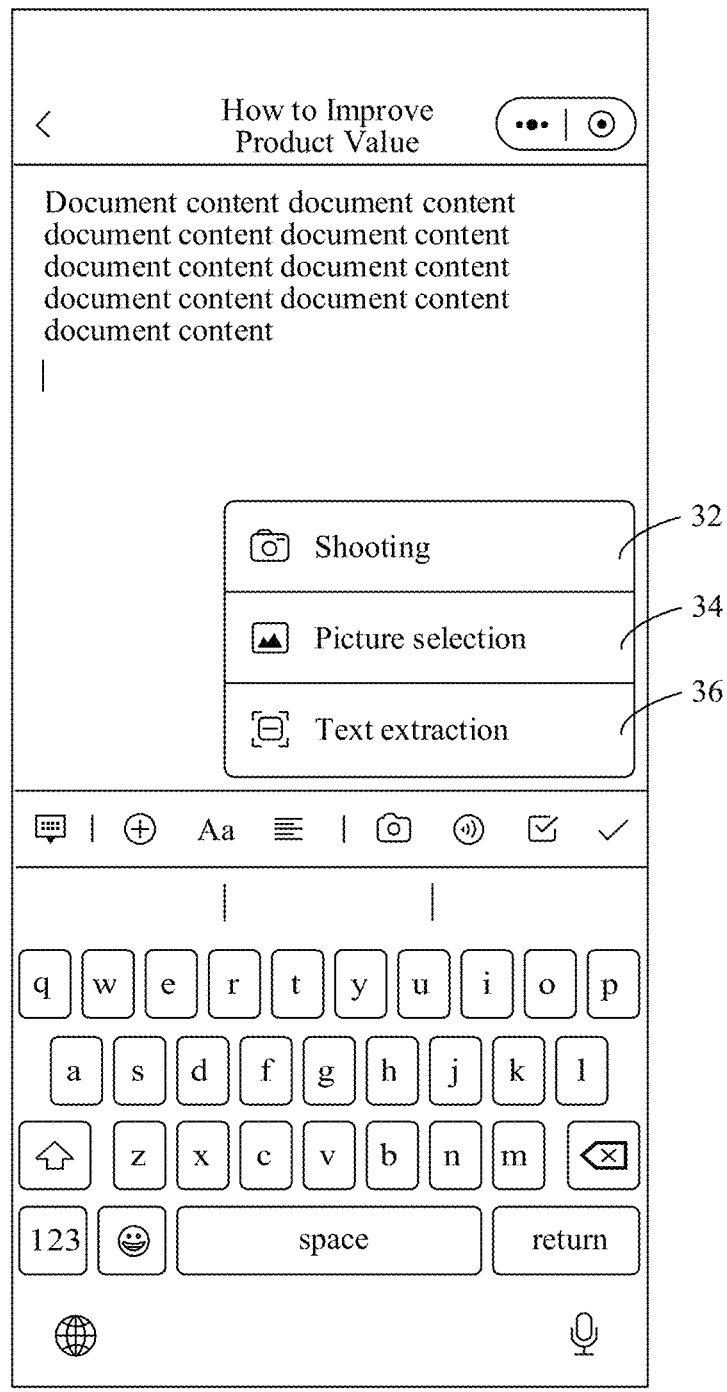
FIG. 9 is a schematic diagram of an interface of a method for editing an electronic document according to an exemplary embodiment of the present disclosure.

Referring to FIG. 9, using an example in which the multimedia file is a picture, the insertion menu includes at least one of a shooting control 32, a selection control 34 for a local file, or a text extraction control 36. The shooting control 32 is a control configured to trigger to use a camera to shoot to obtain a picture. The selection control 34 for a local file is a control configured to trigger to use a file manager to make a selection from local files, for example, use an album program to select a local photograph from a local album. The text extraction control 36 is a control configured to identify text in a captured picture or a local picture.

In an example, when a human-computer interaction operation performed by the user is received, the mobile terminal displays the insertion menu in the second editing interface of the electronic document in the second client. In another example, when the collaboration entry information carries the indication identifier, the mobile terminal automatically invokes and displays the insertion menu in the second editing interface of the electronic document.

Step 518: The second client shoots, when the insertion menu includes a shooting control, a to-be-inserted multimedia file through a camera in response to a trigger operation on the shooting control.

The trigger operation on the shooting control includes at least one of a click operation, a double-click operation, a pressure touch operation, a floating touch operation, a gesture operation, or a voice operation.

The second client shoots the to-be-inserted multimedia file through a camera in response to a trigger operation on the shooting control.

Step 520: The second client selects, when the insertion menu includes a selection control for a local file, the to-be-inserted multimedia file from local files through a file manager in response to a trigger operation on the selection control.

The trigger operation on the selection control includes at least one of a click operation, a double-click operation, a pressure touch operation, a floating touch operation, a gesture operation, or a voice operation.

The second client selects the to-be-inserted multimedia file from local files through the file manager in response to the trigger operation on the selection control. Schematically, the second client displays the local files as candidate files through the file manager. After receiving the selection operation performed by the user, the selected candidate file is used as the to-be-inserted multimedia file.

Step 522: The second client inserts the multimedia file into the first insertion position in the second editing interface.

The second client inserts the multimedia file into the first insertion position of the electronic document for display.

In some embodiments, the second client extracts, in response to a trigger operation on the text extraction control, text content from the multimedia file that has been inserted, and insert the text content into the first insertion position of the electronic document. After the text content is inserted into the first insertion position of the electronic document, the inserted multimedia file can be kept or replaced by the text content.

In some embodiments, the second client extracts, in response to a trigger operation on the text extraction control, text content from the multimedia file that is selected by the user and that is not inserted, and insert the text content into the first insertion position of the electronic document.

Step 524: The second client synchronizes the electronic document having the multimedia file inserted to the first client.

The second client synchronizes the electronic document having the multimedia file inserted to the first client through the collaboration server. Schematically, the second client synchronizes the multimedia file and the insertion position of the multimedia file to the first client through the collaboration server. Alternatively, the second client synchronizes the access address of the multimedia file and the insertion position of the multimedia file to the first client through the collaboration server. The access address of the multimedia file can be provided by the collaboration server after storing the multimedia file.

Step 526: The first client displays the multimedia file inserted by the second client in the first editing interface of the electronic document.

After obtaining the synchronized multimedia file, the first client displays the multimedia file inserted by the second client in the first editing interface of the electronic document.

In conclusion, in the method provided in this embodiment, an insertion collaboration entry is provided by the first client to the second client, a multimedia file acquired by a mobile terminal in real time or a multimedia file in local files is quickly inserted by using the second client into an electronic document currently in an editing state in the first client, so that a capability of quickly inserting a multimedia file can be implemented through only a plurality of simple operations.

In the method provided in this embodiment, the second client automatically locates and displays the first insertion position, so that the user does not need to locate the first insertion position by using the second client, which reduces the operation steps performed by the user and improves the human-computer interaction efficiency. In particular, obtaining the second insertion position by using the synchronization technology can also ensure accuracy of the first insertion position even if the first insertion position is changed after the insertion collaboration graphic barcode is generated.

In the method provided in this embodiment, the second client further automatically invokes and displays the insertion menu, so that the user does not need to manually open the insertion menu, which reduces the operation steps performed by the user and improves the human-computer interaction efficiency.

Figure 10:
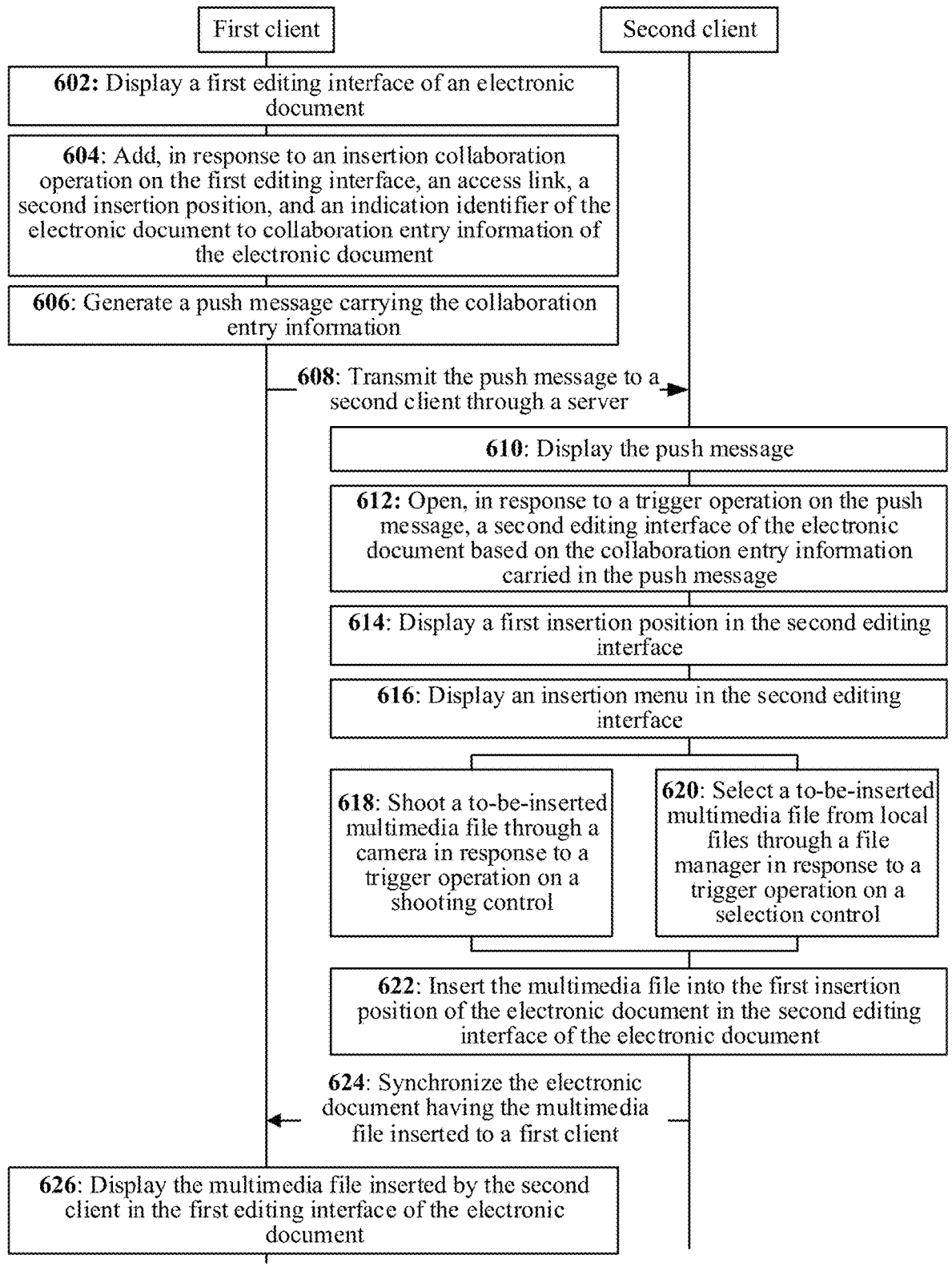
FIG. 10 is a schematic flowchart of a method for editing an electronic document according to an exemplary embodiment of the present disclosure.

When the Insertion Collaboration Entry is a Push Message:

FIG. 10 is a flowchart of a method for editing an electronic document according to an exemplary embodiment of the present disclosure. The method is performed collaboratively by the first client and the second client. The method includes the following steps:

Step 602: The first client displays a first editing interface of an electronic document.

Step 604: The first client adds, in response to an insertion collaboration operation on the first editing interface, an access link, a second insertion position, and an indication identifier of the electronic document to collaboration entry information of the electronic document.

For the detailed implementations of step 602 to step 604, reference may be made to step 502 to step 504, and details are not described herein again.

Step 606: The first client generates a push message carrying the collaboration entry information.

The push message is a message transmitted to an application in the mobile terminal using a push service.

In some embodiments, the first client generates a push message after mapping the collaboration entry information into a short link in a short link mapping manner. Alternatively, the first client generates a push message after encrypting the collaboration entry information to obtain encrypted information.

Step 608: The first client transmits the push message to the second client through a server.

The first client transmits a push message to the second client through a pushing capability of a push server.

In some embodiments, a user account is carried in the push message. The first client transmits the push message to the second client corresponding to the user account in the push message. Alternatively, the first client transmits the push message to the second client corresponding to the user account having an editing permission of the electronic document.

Step 610: The second client displays the push message.

After receiving the push message, the second client displays the push message. Alternatively, after receiving the push message, the operating system on the mobile terminal displays the push message as a system message.

Step 612: The second client opens, in response to a trigger operation on the push message, a second editing interface of the electronic document based on the collaboration entry information carried in the push message.

The trigger operation on the push message includes at least one of a click operation, a double-click operation, a pressure touch operation, a floating touch operation, a gesture operation, or a voice operation.

Figure 11:
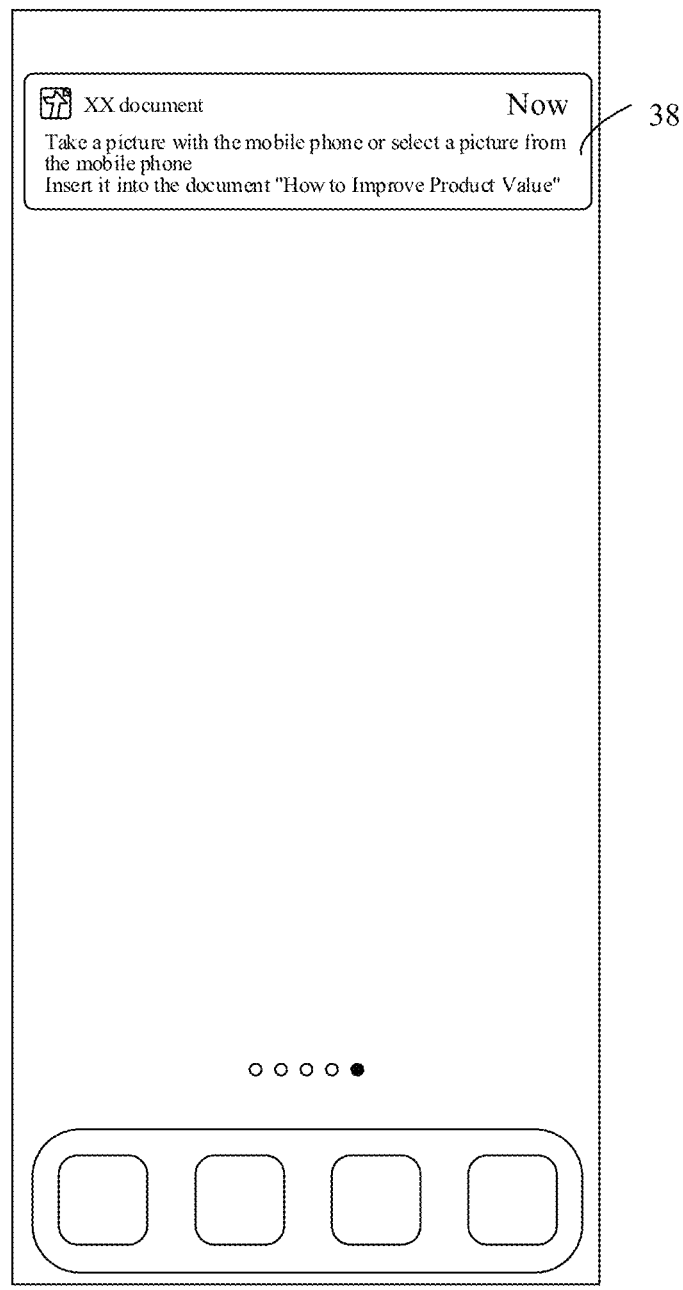
FIG. 11 is a schematic diagram of an interface of a method for editing an electronic document according to another exemplary embodiment of the present disclosure.

Referring to FIG. 11, when the user clicks a push message 38, the second client opens a second editing interface of the electronic document in the second client based on the collaboration entry information carried in the push message.

When the collaboration entry information is represented by a short link, the second client needs to use the short link to obtain detailed information of the collaboration entry information from the collaboration server. When the collaboration entry information is encrypted, the second client needs to obtain the collaboration entry information after decrypting the encrypted information.

The collaboration entry information includes an access link, insertion position information, and an indication identifier of the electronic document. In some embodiments, the insertion position information and the indication identifier are optional.

The collaboration entry information includes at least an access link of the electronic document.

The second client opens the second editing interface of the electronic document in the second client according to the access link of the electronic document. Schematically, the second client obtains document content of the electronic document according to the access link of the electronic document, and loads and displays the document content of the electronic document, to display the second editing interface of the electronic document in the second client.

In some embodiments, the collaboration entry information further includes a user account. When the second client identifies that its user account matches the user account in the collaboration entry information (that is, the same user account), that is, when its user account has an editing permission of the electronic document, the second editing interface of the electronic document is opened in the second client.

Alternatively, when the user account in the second client is different from the user account in the first client, and the user account in the second client has the editing permission of the electronic document, the second client opens the second editing interface of the electronic document in the second client.

Step 614: The second client displays a first insertion position in the second editing interface.

Step 616: The second client displays an insertion menu in the second editing interface.

Step 618: The second client shoots, when the insertion menu includes a shooting control, a to-be-inserted multimedia file through a camera in response to a trigger operation on the shooting control.

Step 620: The second client selects, when the insertion menu includes a selection control for a local file, the to-be-inserted multimedia file from local files through a file manager in response to a trigger operation on the selection control.

Step 622: The second client inserts the multimedia file into the first insertion position of the electronic document in the second editing interface of the electronic document.

Step 624: The second client synchronizes the electronic document having the multimedia file inserted to the first client.

Step 626: The first client displays the multimedia file inserted by the second client in the first editing interface of the electronic document.

For the detailed implementations of step 614 to step 626, reference may be made to step 514 to step 526, and details are not described herein again.

In conclusion, in the method provided in this embodiment, an insertion collaboration entry is provided by the first client to the second client, a multimedia file acquired by a mobile terminal in real time or a multimedia file in local files is quickly inserted by using the second client into an electronic document currently in an editing state in the first client, so that a capability of quickly inserting a multimedia file can be implemented through only a plurality of simple operations.

In the method provided in this embodiment, the second client automatically locates and displays the first insertion position, so that the user does not need to locate the first insertion position by using the second client, which reduces the operation steps performed by the user and improves the human-computer interaction efficiency.

In the method provided in this embodiment, the second client further automatically invokes and displays the insertion menu, so that the user does not need to manually open the insertion menu, which reduces the operation steps performed by the user and improves the human-computer interaction efficiency.

Figure 12:
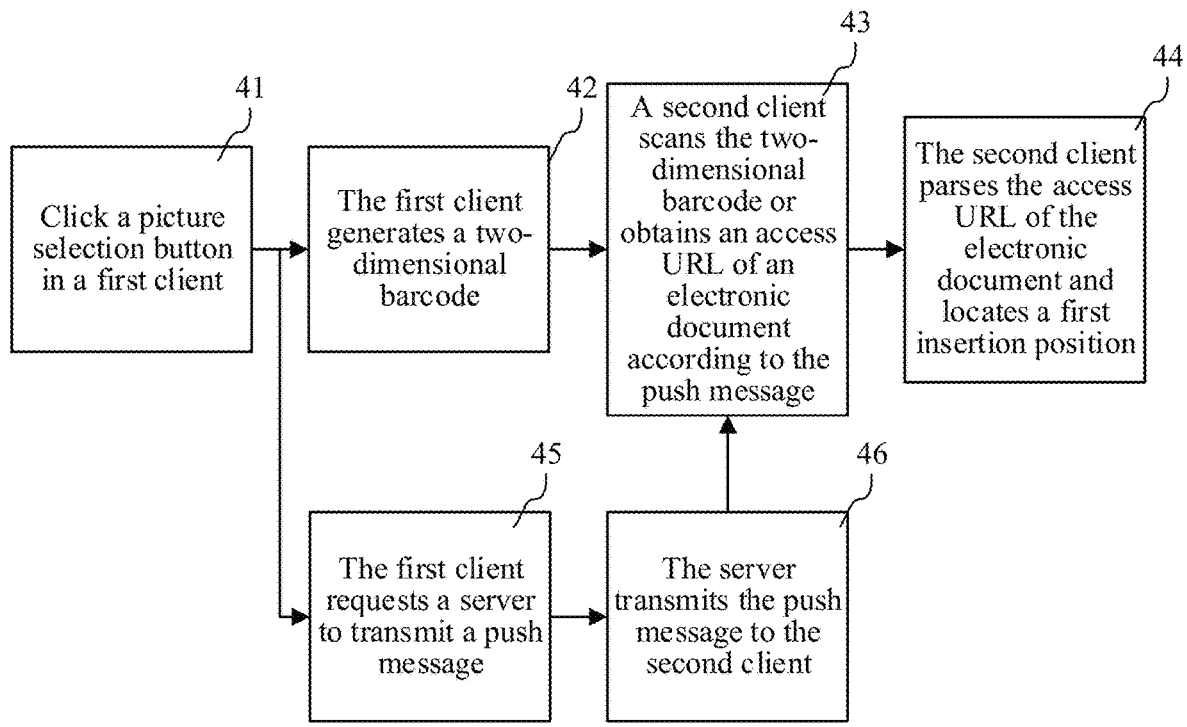
FIG. 12 is a schematic flowchart of a method for editing an electronic document according to another exemplary embodiment of the present disclosure.

In a schematic example shown in FIG. 12, in step 41, the user clicks a picture selection button in the first client, to trigger a collaborative insertion procedure of the multimedia file. A user can trigger the collaborative insertion procedure in at least one of two manners.

Manner 1. Graphic Barcode Collaboration

In step 42, the first client generates a generate a two-dimensional barcode, the two-dimensional barcode carrying an access uniform resource locator (URL) of the electronic document. In step 43, the second client scans the two-dimensional barcode to obtain the access URL of the electronic document. In step 44, the second client parses the access URL of the electronic document and locates a first insertion position. Then, the user uses the second client to take a picture for insertion or select a local file for insertion.

Manner 2. Push Message Collaboration

In step 45, the first client requests a server to transmit a push message, the push message carrying an access URL of the electronic document. In step 46, the server transmits the push message to the second client. In step 43, the second client obtains the access URL of the electronic document from the push message. In step 44, the second client parses the access URL of the electronic document and locates a first insertion position. Then, the user uses the second client to take a picture for insertion or select a local file for insertion.

The foregoing procedure involves three technologies as follows:

1. Two-Dimensional Barcode Generation Technology

The two-dimensional barcode generation technology is used for generating an access link of the electronic document based on the two-dimensional barcode generation capability. In addition, the access link also carries at least one parameter of insertion position information, an indication identifier, or a user account, and includes relevant information of a user account clicking "Take a picture with the mobile phone or select a picture from the mobile phone" in the electronic document, identifier information indicating selecting a picture from the mobile phone, and the like. The two-dimensional barcode informs the second client of selecting a picture from the mobile phone, as well as a specific user account that requires selecting a picture from the mobile phone, so as to ensure the correctness of the first insertion position during multi-person collaboration. After being generated, the two-dimensional barcode can be scanned by using the parent application, and the second client (for example, the applet) of the electronic document is directly jumped to, to parse the two-dimensional barcode.

The two-dimensional barcode generation technology is implemented mainly based on a quick response code (QR code) library in the second client.

The second client provides a document node for mounting a finally generated two-dimensional barcode and relevant text.

In some embodiments, first, the second client generates a two-dimensional barcode without a program icon, and determines a size of the two-dimensional barcode and an occupied size of the program icon located at the center of the two-dimensional barcode. Then, the QR code library generates a two-dimensional barcode carrying collaboration entry information according to the collaboration entry information imported from the electronic document.

After the two-dimensional barcode without a program icon is loaded, the second client creates a canvas tag of a browser front-end, and draws the two-dimensional barcode on the canvas tag. The second client loads its own program icon, and draws the program icon to the center position of the two-dimensional barcode by using the drawing capability of the canvas tag. After the program icon is completed loaded and drawn, the second client mounts the created canvas tag on the document node provided by the second client, and the browser renders the document node, so that a two-dimensional barcode with a program icon can be presented.

2. Message Pushing Technology

The first client pushes a push message with a collaboration entry information instruction to the second client by using the message pushing technology. That is, while generating the two-dimensional barcode, the first client also transmits the push message to the server, and the server forwards the push message to the second client.

Figure 13:
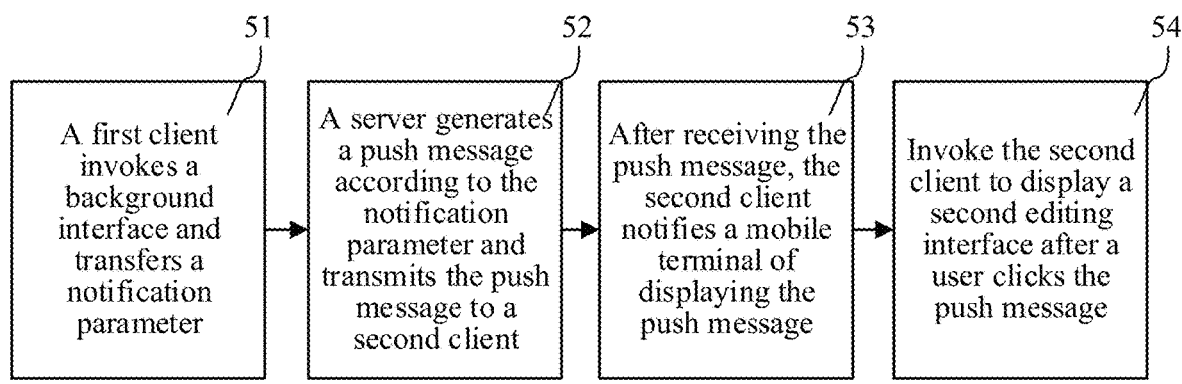
FIG. 13 is a schematic flowchart of a method for editing an electronic document according to another exemplary embodiment of the present disclosure.

Referring to FIG. 13, in step 51, while generating the two-dimensional barcode, the first client invokes a background interface and transfers a notification parameter, to trigger the server to perform a message pushing service. The notification parameter includes parameters in the collaboration entry information. In step 52, the server generates a push message according to the notification parameter, and notifies the second client of the push message.

In step 53, after receiving the push message, the second client notifies a mobile device, and pops up a pop-up window of the push message on the mobile terminal to display pushes text. In step 54, the user triggers the pop-up window to invoke the second client. After being invoked, the second client jumps to the first insertion position in the electronic document according to the obtained collaboration entry information.

3. Link Parsing Technology

The link parsing technology is used for parsing parameters, such as an access URL, insertion position information, an indication identifier, and a user account, in the collaboration entry information of the electronic document, so as to determine, according to the parameters, whether to locate the cursor and implement functions of invoking and displaying the insertion menu. When it is determined that the cursor needs to be located, a cursor position in the second client is synchronized with the first client, and at the same time, the insertion menu is automatically invoked for display.

Figure 14:
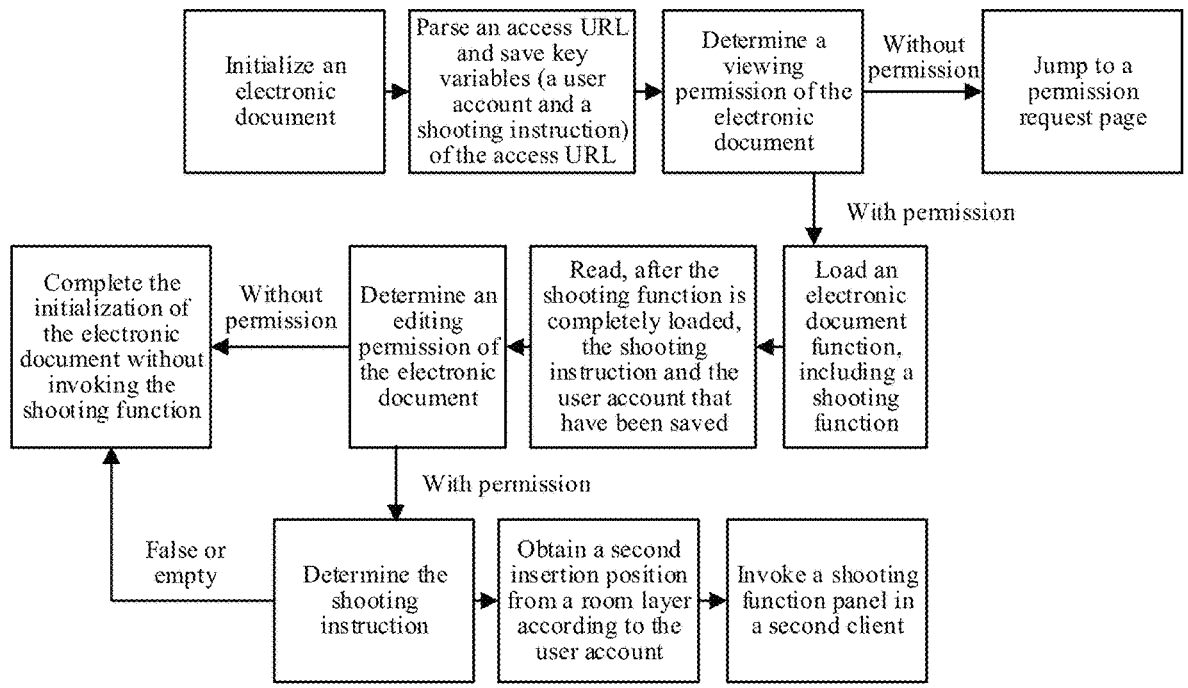
FIG. 14 is a schematic flowchart of a method for editing an electronic document according to another exemplary embodiment of the present disclosure.

As shown in FIG. 14, after obtaining the collaboration entry information in the second editing interface of the electronic document in the second client, the second client parses the collaboration entry information. When there is insertion position information in the collaboration entry information, an identifier x is saved as a variable of the second client, and at the same time, the user account is saved.

During initialization of the electronic document, a permission module of the electronic document is also initialized, to determine whether a visitor has a viewing permission of the electronic document, and if not, a permission request page of the electronic document is entered.

When the visitor has a viewing or editing permission, the electronic document is initialized as usual, and the electronic document interacts with the server in the background during the initialization, to obtain information about a room layer (a server-side container during collaboration between different devices), including second insertion position messages of all collaborators in the current electronic document, and record the second insertion position messages according to user accounts.

After a camera module of the second client is initialized, searching is performed to determine whether stored variables of the electronic document include the identifier x. If the stored variables include the identifier x, a locating operation is performed for the first insertion position.

In this case, the second client reads a previously saved user account, and obtains the second insertion position corresponding to the user account from current cursor information saved in the initialization stage. In this case, it is determined whether the user account has an editing permission. When the user account does not have the editing permission, no operation is performed. When the user account has the editing permission, the cursor of the second client is focused to the first insertion position, to activate an editing state of the electronic document. Then, a click event of the insertion menu in the second client is triggered, to automatically wake up the insertion menu. Then, the user can freely choose, according to requirements of the user, to select a picture from local pictures for insertion or take a new picture for insertion.

Figure 15:
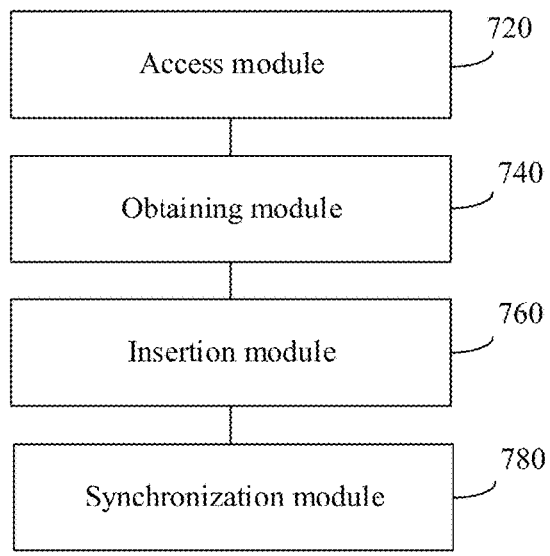
FIG. 15 is a schematic structural diagram of an apparatus for editing an electronic document according to an exemplary embodiment of the present disclosure.

FIG. 15 is a block diagram of an apparatus for editing an electronic document according to an exemplary embodiment of the present disclosure. The apparatus includes:

an access module 720, configured to open a second editing interface of an electronic document in a second client by using an insertion collaboration entry provided by a first client on a first computer device, the insertion collaboration entry being used for collaborating with the first client to perform a multimedia file insertion into the electronic document;

an obtaining module 740, configured to obtain a to-be-inserted multimedia file; and an insertion module 760, configured to insert the multimedia file into a first insertion position in the second editing interface of the electronic document.

In one embodiment, the access module 720 is configured to read collaboration entry information carried by the insertion collaboration entry, the collaboration entry information including an access link of the electronic document; and open the second editing interface of the electronic document in the second client based on the access link of the electronic document.

In one embodiment, the insertion collaboration entry includes: at least one of an insertion collaboration graphic barcode, a push message for starting insertion collaboration, a short message for starting insertion collaboration, email information for starting insertion collaboration, or an instant messaging message for starting insertion collaboration.

In one embodiment, the access module 720 is configured to identify, when the insertion collaboration entry includes the insertion collaboration graphic barcode, the collaboration entry information carried in the insertion collaboration graphic barcode; or display the push message when the insertion collaboration entry includes the push message, and read, in response to a trigger operation on the push message, the collaboration entry information carried in the push message; or display the short message when the insertion collaboration entry includes the short message, and read, in response to a trigger operation on the short message, the collaboration entry information carried in the short message; or display the email information when the insertion collaboration entry includes the email information, and read, in response to a trigger operation on the email information, the collaboration entry information carried in the email information; or display the instant messaging message when the insertion collaboration entry includes the instant messaging message, and read, in response to a trigger operation on the instant messaging message, the collaboration entry information carried in the instant messaging message.

In one embodiment, the access module 720 is configured to display the first insertion position in the second editing interface of the electronic document after opening the second editing interface of the electronic document in the second client, the first insertion position being the same as a second insertion position, the second insertion position being an insertion position of the multimedia file in a first editing interface, the first editing interface being an interface of the electronic document in the first client.

In an example, the insertion collaboration entry carries the collaboration entry information.

The access module 720 is configured to obtain insertion position information from the collaboration entry information, the insertion position information being used for indicating the first insertion position; and display the first insertion position indicated by the insertion position information in the second editing interface of the electronic document.

In an example, the access module 720 is configured to synchronize the second insertion position based on a user account logged in to the second client, the user account having an editing permission of the electronic document; and display the second insertion position as the first insertion position in the second editing interface of the electronic document.

In one embodiment, the obtaining module 740 is configured to display a insertion menu in the second editing interface of the electronic document, the insertion menu including at least one of a shooting control or a selection control for a local file; and shoot the to-be-inserted multimedia file through a camera in response to a trigger operation on the shooting control; or select the to-be-inserted multimedia file from local files through a file manager in response to a trigger operation on the selection control.

In one embodiment, the insertion collaboration entry carries the collaboration entry information.

The obtaining module 740 is configured to display the insertion menu in the second editing interface of the electronic document when an indication identifier is carried in the collaboration entry information, the indication identifier being an identifier used for instructing automatically invoking the insertion menu.

In one embodiment, the insertion menu further includes a text extraction control.

The obtaining module 740 is further configured to extract text content from the multimedia file in response to a trigger operation on the text extraction control; and insert the text content into the first insertion position of the electronic document.

In one embodiment, the apparatus further includes:

a synchronization module 780, configured to synchronize the electronic document having the multimedia file inserted to the first client.

Figure 16:
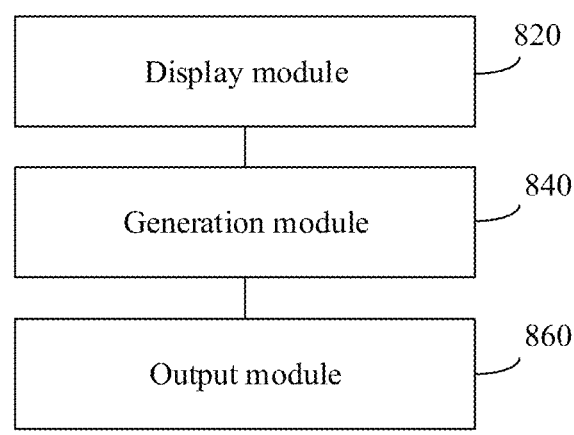
FIG. 16 is a schematic structural diagram of an apparatus for editing an electronic document according to an exemplary embodiment of the present disclosure.

FIG. 16 is a block diagram of an apparatus for editing an electronic document according to an exemplary embodiment of the present disclosure. The apparatus includes:

a display module 820, configured to display a first editing interface of an electronic document in a first client;

a generation module 840, configured to generate an insertion collaboration entry of the electronic document in response to an insertion collaboration operation on the first editing interface, the insertion collaboration entry being used for collaborating with a second client on a second computer device for multimedia file insertion into the electronic document; and an output module 860, configured to provide the insertion collaboration entry to the second client.

In one embodiment, the generation module 840 is configured to add an access link of the electronic document to collaboration entry information of the electronic document; and generate the insertion collaboration entry carrying the collaboration entry information.

In one embodiment, the insertion collaboration entry includes: at least one of an insertion collaboration graphic barcode, a push message for starting insertion collaboration, a short message for starting insertion collaboration, email information for starting insertion collaboration, or an instant messaging message for starting insertion collaboration.

In one embodiment, the insertion collaboration entry carries the collaboration entry information. The generation module 840 is configured to add a second insertion position of the electronic document as insertion position information to the collaboration entry information of the electronic document, the insertion position information being used for indicating a first insertion position of the multimedia file in a second editing interface, the second editing interface being an interface of the electronic document in the second client; or synchronize the second insertion position to the second client based on an object account logged in to the second client, the second insertion position being an insertion position of the multimedia file in the first editing interface.

In one embodiment, the insertion collaboration entry carries the collaboration entry information.

The generation module 840 is configured to add an indication identifier to the collaboration entry information, the indication identifier being an identifier used for instructing the second client to automatically invoke an insertion menu.

In one embodiment, the display module 820 is further configured to display the multimedia file inserted by the second client in the first editing interface of the electronic document.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 17:
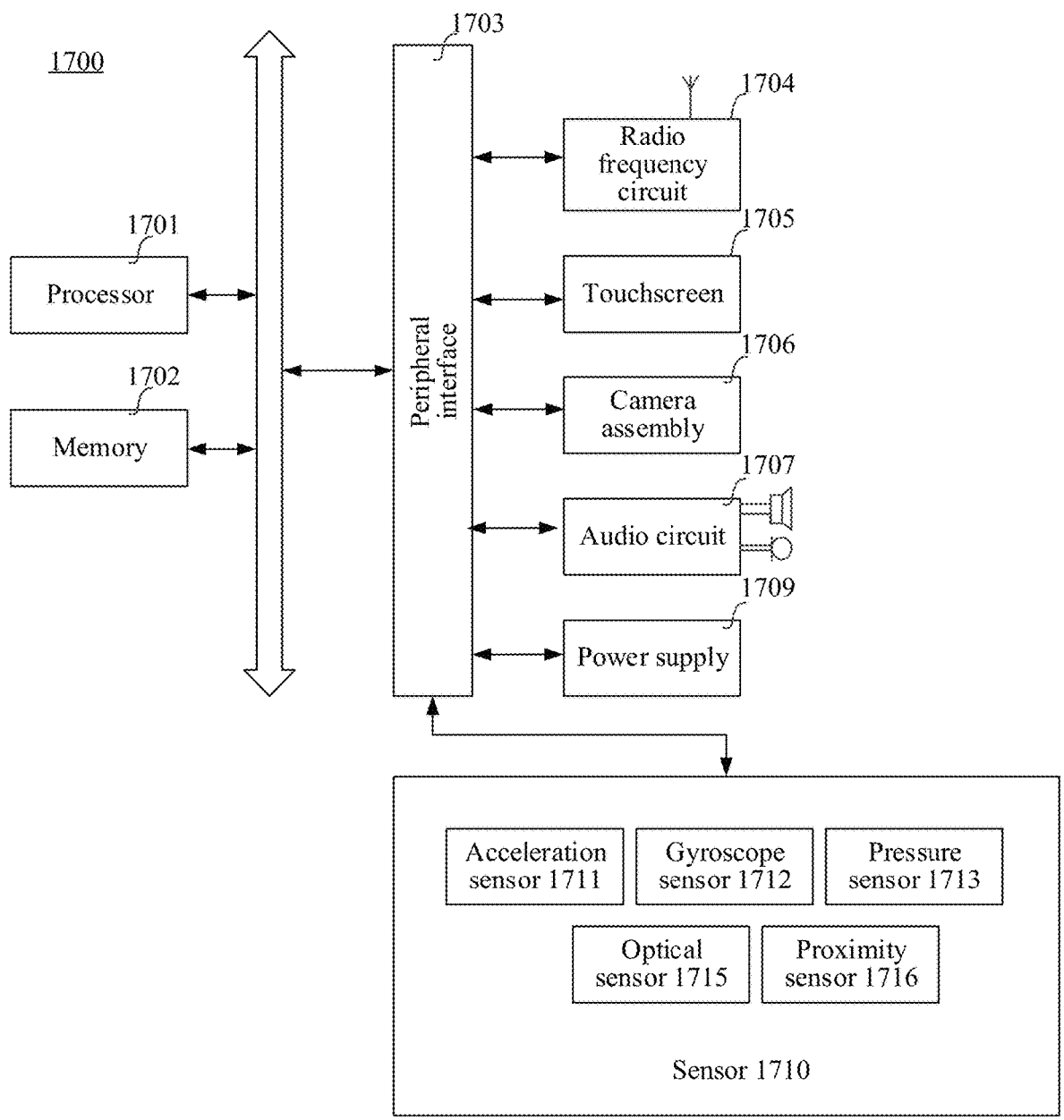
FIG. 17 is a structural block diagram of a terminal according to an exemplary embodiment of the present disclosure.

FIG. 17 is a structural block diagram of a mobile terminal 1700 according to an exemplary embodiment of the present disclosure. The mobile terminal 1700 may be a portable mobile terminal, for example, a smart phone, a tablet PC, a Moving Picture Experts Group Audio Layer III (MP3) player, or a Moving Picture Experts Group Audio Layer IV (MP4) player. The mobile terminal 1700 may be further referred to as other names such as user equipment and a portable terminal.

Generally, the mobile terminal 1700 includes a processor 1701 and a memory 1702.

The processor 1701 may include one or more processing cores, and may be, for example, a 4-core processor or an 8-core processor. The processor 1701 may be implemented by using at least one hardware form of a digital signal processor (DSP), a field-programmable gate array (FPGA), and a programmable logic array (PLA). The processor 1701 may also include a main processor and a coprocessor. The main processor is configured to process data in an active state, also referred to as a central processing unit (CPU). The coprocessor is a low-power processor configured to process data in a standby state. In some embodiments, the processor 1701 may be integrated with a graphics processing unit (GPU). The GPU is configured to render and draw content that needs to be displayed on a display screen. In some embodiments, the processor 1701 may further include an artificial intelligence (AI) processor. The AI processor is configured to process computing operations related to machine learning.

The memory 1702 may include one or more computer-readable storage media. The computer-readable storage medium may be tangible and non-transient. The memory 1702 may further include a high-speed random access memory and a non-volatile memory, for example, one or more disk storage devices or flash storage devices. In some embodiments, the non-transitory computer-readable storage medium in the memory 1702 is configured to store at least one instruction, and the at least one instruction being configured to be executed by the processor 1701 to implement the method provided in the embodiments of the present disclosure.

In some embodiments, the mobile terminal 1700 may include a peripheral interface 1703 and at least one peripheral. Specifically, the peripheral includes: at least one of a radio frequency (RF) circuit 1704, a touchscreen 1705, a camera assembly 1706, an audio circuit 1707, or a power supply 1709.

The peripheral device interface 1703 may be configured to connect at least one peripheral device related to input/output (I/O) to the processor 1701 and the memory 1702. In some embodiments, the processor 1701, the memory 1702, and the peripheral interface 1703 are integrated on the same chip or the same circuit board. In some other embodiments, any or both of the processor 1701, the memory 1702, and the peripheral interface 1703 may be implemented on an independent chip or circuit board. This is not limited in this embodiment.

The RF circuit 1704 is configured to receive and transmit an RF signal, which is also referred to as an electromagnetic signal. The RF circuit 1704 communicates with a communication network and other communication devices through the electromagnetic signal. The RF circuit 1704 converts an electrical signal into an electromagnetic signal for transmission, or converts a received electromagnetic signal into an electrical signal. In some embodiments, the RF circuit 1704 includes: an antenna system, an RF transceiver, one or more amplifiers, a tuner, an oscillator, a digital signal processor, a codec chip set, a subscriber identity module card, and the like. The RF circuit 1704 may communicate with other terminals by using at least one wireless communication protocol. The wireless communication protocol includes, but is not limited to: a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 1704 may further include a circuit related to near field communication (NFC). This is not limited in the present disclosure.

The touchscreen 1705 is configured to display a user interface (UI). The UI may include graphics, text, icons, videos, and any combination thereof. The touchscreen 1705 also has a capability of collecting a touch signal on or above a surface of the touchscreen 1705. The touch signal may be inputted, as a control signal, to the processor 1701 for processing. The touchscreen 1705 is configured to provide a virtual button and/or a virtual keyboard, which is also referred to as a soft button and/or a soft keyboard. In some embodiments, there may be one touchscreen 1705, disposed on a front panel of the mobile terminal 1700. In some other embodiments, there may be at least two touchscreens 1705, disposed on different surfaces of the mobile terminal 1700 respectively or in a folded design. In still other embodiments, the touchscreen 1705 may be a flexible display screen, disposed on a curved surface or a folded surface of the mobile terminal 1700. Even, the touchscreen 1705 may be further set in a non-rectangular irregular pattern, namely, a special-shaped screen. The touchscreen 1705 may be made of a material such as a liquid crystal display (LCD) or an organic light-emitting diode (OLED).

The camera assembly 1706 is configured to collect images or videos. In some embodiments, the camera assembly 1706 includes a front-facing camera and a rear-facing camera. Generally, the front-facing camera is configured to implement a video call or self-portrait. The rear-facing camera is configured to capture a picture or a video. In some embodiments, there are at least two rear-facing cameras, which are respectively any one of a main camera, a depth-of-field camera, or a wide-angle camera, to implement a background blurring function by fusing the main camera with the depth-of-field camera, and implement panoramic shooting and virtual reality (VR) shooting functions by fusing the main camera with the wide-angle camera. In some embodiments, the camera assembly 1706 may further include a flashlight. The flash may be a single color temperature flash, or may be a double color temperature flash. The double color temperature flash refers to a combination of a warm flash and a cold flash, and may be used for light compensation at different color temperatures.

The audio circuit 1707 is configured to provide an audio interface between a user and the mobile terminal 1700. The audio circuit 1707 may include a microphone and a speaker. The microphone is configured to collect sound waves of users and surroundings, and convert the sound waves into electrical signals and input the signals to the processor 1701 for processing, or input the signals to the RF circuit 1704 to implement voice communication. For a purpose of stereo acquisition or noise reduction, there may be a plurality of microphones disposed at different portions of the mobile terminal 1700. The microphone may be further an array microphone or an omnidirectional microphone. The speaker is configured to convert electrical signals from the processor 1701 or the RF circuit 1704 into sound waves. The speaker may be a conventional thin-film speaker or a piezoelectric ceramic speaker. When the speaker is the piezoelectric ceramic speaker, the speaker can not only convert electrical signals into sound waves audible to a human being, but also convert electrical signals into sound waves inaudible to the human being for ranging and other purposes. In some embodiments, the audio circuit 1707 may further include a headphone jack.

The power supply 1709 is configured to supply power to components in the mobile terminal 1700. The power supply 1709 may be an alternating-current power supply, a direct-current power supply, a disposable battery, or a rechargeable battery. When the power supply 1709 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may further be configured to support a quick charge technology.

In some embodiments, the mobile terminal 1700 further includes one or more sensors 1710. The one or more sensors 1710 include, but are not limited to, an acceleration sensor 1711, a gyroscope sensor 1712, a pressure sensor 1713, an optical sensor 1715, and a proximity sensor 1716.

The acceleration sensor 1711 may detect a magnitude of acceleration on three coordinate axes of a coordinate system established by the mobile terminal 1700. For example, the acceleration sensor 1711 may be configured to detect components of gravity acceleration on the three coordinate axes. The processor 1701 may control, according to a gravity acceleration signal acquired by the acceleration sensor 1711, the touchscreen 1705 to display the user interface in a transverse view or a longitudinal view. The acceleration sensor 1711 may be further configured to collect data of a game or a user movement.

The gyroscope sensor 1712 may detect a body direction and a rotation angle of the mobile terminal 1700, and the gyroscope sensor 1712 may work with the acceleration sensor 1711 to collect a 3D action performed by the user on the mobile terminal 1700. The processor 1701 may implement the following functions according to the data collected by the gyroscope sensor 1712: motion sensing (for example, changing the UI according to a tilt operation of the user), image stabilization during shooting, game control, and inertial navigation.

The pressure sensor 1713 may be disposed on a side frame of the mobile terminal 1700 and/or a lower layer of the touchscreen 1705. When the pressure sensor 1713 is disposed at the side frame of the mobile terminal 1700, a holding signal of the user on the mobile terminal 1700 may be detected, and left/right hand identification and a quick action may be performed according to the holding signal. When the pressure sensor 1713 is disposed at the lower layer of the touchscreen 1705, an operable control on the UI interface can be controlled according to a pressure operation of the user on the touchscreen 1705. The operable control includes at least one of a button control, a scroll-bar control, an icon control and a menu control.

The optical sensor 1715 is configured to collect ambient light intensity. In an embodiment, the processor 1701 may control the display brightness of the touchscreen 1705 according to the ambient light intensity acquired by the optical sensor 1715. Specifically, when the ambient light intensity is relatively high, the display luminance of the touchscreen 1705 is increased, and when the ambient light intensity is relatively low, the display brightness of the touchscreen 1705 is reduced. In another embodiment, the processor 1701 may further dynamically adjust a camera parameter of the camera assembly 1706 according to the ambient light intensity acquired by the optical sensor 1715.

The proximity sensor 1716, also referred to as a distance sensor, is generally disposed on the front surface of the mobile terminal 1700. The proximity sensor 1716 is configured to collect a distance between the user and the front surface of the mobile terminal 1700. In an embodiment, when the proximity sensor 1716 detects that the distance between the user and the front surface of the mobile terminal 1700 gradually becomes small, the touchscreen 1701 is controlled by the processor 1705 to switch from a screen-on state to a screen-off state. When the proximity sensor 1716 detects that the distance between the user and the front surface of the mobile terminal 1700 gradually increases, the touchscreen 1701 is controlled by the processor 1705 to switch from the screen-off state to the screen-on state.

A person skilled in the art may understand that the structure shown in FIG. 17 does not constitute a limitation to the mobile terminal 1700, and the mobile terminal may include more or fewer components than those shown in the figure, or some components may be combined, or a different component arrangement may be used.

Figure 18:
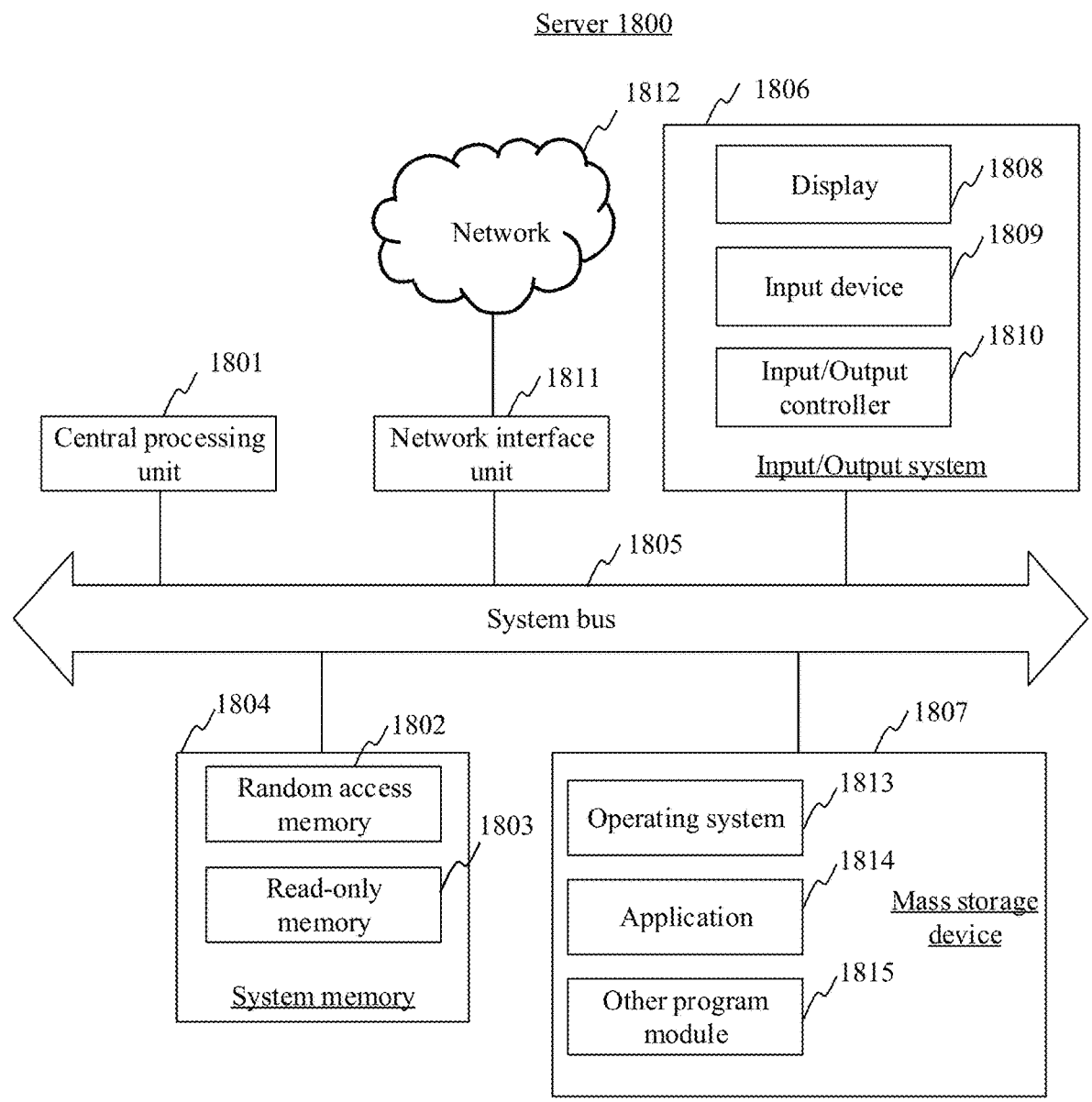
FIG. 18 is a structural block diagram of a server according to an exemplary embodiment of the present disclosure.

FIG. 18 is a schematic structural diagram of a computer device according to an exemplary embodiment of the present disclosure. The computer device can be configured to perform the method for editing an electronic document, performed by a computer device, provided in the foregoing embodiments. A server 1800 includes a central processing unit (CPU) 1801, a random access memory (RAM) 1802, a system memory 1804 of a read-only memory (ROM) 1803, and a system bus 1805 connecting the system memory 1804 to the CPU 1801. The server 1800 further includes a basic input/output (I/O) system 1806 for transmitting information between components in a computer, and a mass storage device 1807 configured to store an operating system 1813, an application 1814, and another program module 1815.

The basic I/O system 1806 includes a display 1808 configured to display information and an input device 1809 such as a mouse and a keyboard for a user to input information. The display 1808 and the input device 1809 are both connected to the CPU 1801 by using an input/output controller 1810 connected to the system bus 1805. The basic I/O system 1806 may further include the I/O controller 1810, to receive and process inputs from a plurality of other devices, such as the keyboard, the mouse, or an electronic stylus. Similarly, the I/O controller 1810 further provides an output to a display screen, a printer, or another type of output device.

The mass storage device 1807 is connected to the central processing unit 1801 through a mass storage controller (not shown) connected to the system bus 1805. The large-capacity storage device 1807 and an associated computer-readable medium provide non-volatile storage for the server 1800. That is, the mass storage device 1807 may include a computer-readable medium (not shown) such as a hard disk or a compact disc ROM (CD-ROM) drive.

In general, the computer-readable medium may include a computer storage medium and a communication medium. The computer storage medium includes volatile and non-volatile, removable and non-removable media that are configured to store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art can learn that the computer storage medium is not limited to the foregoing types. The foregoing system memory 1804 and mass storage device 1807 may be collectively referred to as a memory.

According to various embodiments of the present disclosure, the server 1800 may further be connected, by using a network such as the Internet, to a remote computer on the network and run. That is, the server 1800 may be connected to a network 1812 by using a network interface unit 1811 connected to the system bus 1805, or may be connected to another type of network or a remote computer system (not shown) by using the network interface unit 1811.

The memory further includes one or more programs. The one or more programs are stored in the memory and configured to be executed by one or more CPUs 1801.

The embodiments of the present disclosure further provide a computer-readable storage medium, storing at least one instruction, the at least one instruction being loaded and executed by a processor to implement the method for editing an electronic document described in the foregoing embodiments.

According to an aspect of the present disclosure, a computer program product or a computer program is provided. The computer program product or the computer program includes computer instructions, and the computer instructions are stored in a computer-readable storage medium. A processor of a terminal reads the computer instructions from the computer-readable storage medium, and executes the computer instructions, to cause the terminal to perform the method for editing an electronic document provided in the example implementations of the foregoing aspect.

What is claimed is:

1. A method for editing an electronic document, performed by a second computer device, the method comprising:
   opening a second editing interface of an electronic document in a second client executed on the second computer device by using an insertion collaboration entry provided by a first client on a first computer device, the insertion collaboration entry being used for collaborating with the first client to perform a multimedia file insertion into the same electronic document;
   displaying an insertion menu in the second editing interface of the electronic document, the insertion menu comprising a shooting control;
   obtaining a multimedia file, comprising: in response to a trigger operation on the shooting control, shooting the multimedia file through a camera coupled to the second computer device; and
   inserting the multimedia file into a first insertion position in the second editing interface of the electronic document.

2. The method according to claim 1, wherein the opening a second editing interface of an electronic document in a second client by using an insertion collaboration entry provided by a first client on a first computer device comprises:
   reading collaboration entry information carried by the insertion collaboration entry, the collaboration entry information comprising an access link of the electronic document; and
   opening the second editing interface of the electronic document in the second client based on the access link of the electronic document.

3. The method according to claim 2, wherein the insertion collaboration entry comprises: at least one of an insertion collaboration graphic barcode, a push message for starting insertion collaboration, a short message for starting insertion collaboration, email information for starting insertion collaboration, or an instant messaging message for starting insertion collaboration.

4. The method according to claim 3, wherein the reading collaboration entry information carried by the insertion collaboration entry comprises:
   identifying, when the insertion collaboration entry comprises the insertion collaboration graphic barcode, the collaboration entry information carried in the insertion collaboration graphic barcode;
   displaying the push message when the insertion collaboration entry comprises the push message, and reading, in response to a trigger operation on the push message, the collaboration entry information carried in the push message;
   displaying the short message when the insertion collaboration entry comprises the short message, and reading, in response to a trigger operation on the short message, the collaboration entry information carried in the short message;

displaying the email information when the insertion collaboration entry comprises the email information, and reading, in response to a trigger operation on the email information, the collaboration entry information carried in the email information; and displaying the instant messaging message when the insertion collaboration entry comprises the instant messaging message, and reading, in response to a trigger operation on the instant messaging message, the collaboration entry information carried in the instant messaging message.

5. The method according to claim 1, wherein the method further comprises:

before obtaining the multimedia file, displaying the first insertion position in the second editing interface of the electronic document into which the multimedia file needs to be inserted, the first insertion position being determined to be the same as a second insertion position in a first editing interface of the electronic document in the first client, and the second insertion position being a cursor position in the first editing interface obtained from the first client.

6. The method according to claim 5, wherein the insertion collaboration entry carries the collaboration entry information;

the method further comprises:

obtaining insertion position information from the collaboration entry information, the insertion position information being used for indicating the first insertion position; and the displaying the first insertion position in the second editing interface of the electronic document comprises:

displaying the first insertion position indicated by the insertion position information in the second editing interface of the electronic document.

7. The method according to claim 5, wherein the method further comprises:

synchronizing the second insertion position based on an object account logged in to the second client, the object account having an editing permission of the electronic document; and the displaying the first insertion position in the second editing interface of the electronic document comprises:

displaying the second insertion position as the first insertion position in the second editing interface of the electronic document.

8. The method according to claim 1, wherein the insertion menu further comprises a selection control for a local file; and obtaining the multimedia file further comprises:

selecting the multimedia file from local files through a file manager in response to a trigger operation on the selection control.

9. The method according to claim 1, wherein the insertion collaboration entry carries the collaboration entry information;

the displaying an insertion menu in the second editing interface of the electronic document comprises:

displaying the insertion menu in the second editing interface of the electronic document when an indication identifier is carried in the collaboration entry information, the indication identifier being an identifier used for instructing automatically invoking the insertion menu.

10. The method according to claim 1, wherein the insertion menu further comprises a text extraction control; and the method further comprises:

extracting text content from the multimedia file in response to a trigger operation on the text extraction control; and inserting the text content into the first insertion position of the electronic document.

11. The method according to claim 1, wherein the method further comprises:

synchronizing, with the first client, the electronic document having the multimedia file inserted.

12. A method for editing an electronic document, performed by a first computer device, the method comprising:

displaying a first editing interface of an electronic document in a first client;

obtaining a cursor position in the first editing interface of the electronic document as a second insertion position and generating an insertion collaboration entry of the electronic document in response to an insertion collaboration operation on the first editing interface, the insertion collaboration entry being used for collaborating with a second client on a second computer device for multimedia file insertion into the electronic document; and providing the insertion collaboration entry to the second client, wherein the insertion collaboration entry carries the second insertion position, and the second insertion position indicating a first insertion position in a second editing interface of the same electronic document on the second client into which a multimedia file needs to be inserted.

13. The method according to claim 12, wherein the generating an insertion collaboration entry of the electronic document in response to an insertion collaboration operation on the first editing interface comprises:

adding an access link of the electronic document to collaboration entry information of the electronic document; and generating the insertion collaboration entry carrying the collaboration entry information.

14. The method according to claim 13, wherein the insertion collaboration entry comprises: at least one of an insertion collaboration graphic barcode, a push message for starting insertion collaboration, a short message for starting insertion collaboration, email information for starting insertion collaboration, or an instant messaging message for starting insertion collaboration.

15. The method according to claim 12, wherein the insertion collaboration entry carries the collaboration entry information;

the method further comprises:

adding an indication identifier to the collaboration entry information, the indication identifier being an identifier used for instructing the second client to automatically invoke an insertion menu.

16. A second computer device, comprising: a processor and a memory, the memory storing at least one instruction, at least one program, a code set, or an instruction set, the at least one instruction, the at least one program, the code set, or the instruction set being loaded and executed by the processor to implement:

opening a second editing interface of an electronic document in a second client executed on the second computer device by using an insertion collaboration entry provided by a first client on a first computer device, the insertion collaboration entry being used for collaborating with the first client to perform a multimedia file insertion into the same electronic document;

displaying an insertion menu in the second editing interface of the electronic document, the insertion menu comprising a shooting control;

obtaining a multimedia file, comprising: in response to a trigger operation on the shooting control, shooting the multimedia file through a camera coupled to the second computer device; and inserting the multimedia file into a first insertion position in the second editing interface of the electronic document.

17. The second computer device according to claim 16, wherein the opening a second editing interface of an electronic document in a second client by using an insertion collaboration entry provided by a first client on a first computer device comprises:

reading collaboration entry information carried by the insertion collaboration entry, the collaboration entry information comprising an access link of the electronic document; and opening the second editing interface of the electronic document in the second client based on the access link of the electronic document.

18. The second computer device according to claim 17, wherein the insertion collaboration entry comprises: at least one of an insertion collaboration graphic barcode, a push message for starting insertion collaboration, a short message for starting insertion collaboration, email information for starting insertion collaboration, or an instant messaging message for starting insertion collaboration.

19. The second computer device according to claim 16, wherein the processor is further configured to perform:

before obtaining the multimedia file, displaying the first insertion position in the second editing interface of the electronic document into which the multimedia file needs to be inserted, the first insertion position being determined to be the same as a second insertion position in a first editing interface of the electronic document in the first client, and the second insertion position being a cursor position in the first editing interface obtained from the first client.

* * * * *